(12) United States Patent
Kitaura

(10) Patent No.: US 8,189,430 B2
(45) Date of Patent: May 29, 2012

(54) ELECTRONIC APPARATUS OPERABLE BY EXTERNAL SOUND

(75) Inventor: Masahiro Kitaura, Kanagawa-ken (JP)

(73) Assignee: Victor Company of Japan, Ltd., Yokohama (JP)

( * ) Notice: Subject to any disclaimer, the term of this patent is extended or adjusted under 35 U.S.C. 154(b) by 256 days.

(21) Appl. No.: 12/591,483

(22) Filed: Nov. 20, 2009

(65) Prior Publication Data

US 2010/0188929 A1    Jul. 29, 2010

(30) Foreign Application Priority Data

Jan. 23, 2009 (JP) .................................. 2009-012512
Aug. 26, 2009 (JP) .................................. 2009-194922

(51) Int. Cl.
*G01S 3/80* (2006.01)
(52) U.S. Cl. ........................................................ 367/127
(58) Field of Classification Search .................... 367/127
See application file for complete search history.

(56) References Cited

U.S. PATENT DOCUMENTS

| | | | | |
|---|---|---|---|---|
| 5,054,007 | A * | 10/1991 | McDonough | 367/139 |
| 5,677,675 | A | 10/1997 | Taylor et al. | |
| 5,831,936 | A * | 11/1998 | Zlotnick et al. | 367/124 |
| 5,926,090 | A * | 7/1999 | Taylor et al. | 340/568.1 |
| 6,469,732 | B1 * | 10/2002 | Chang et al. | 348/14.08 |
| 6,535,131 | B1 * | 3/2003 | Bar-Shalom et al. | 340/573.1 |
| 6,664,892 | B2 * | 12/2003 | Thomas et al. | 340/505 |
| 7,894,941 | B2 * | 2/2011 | Ogawa et al. | 700/258 |
| 2004/0015265 | A1 | 1/2004 | Asano et al. | |
| 2006/0146648 | A1 * | 7/2006 | Ukita | 367/129 |
| 2008/0052079 | A1 * | 2/2008 | Ohguri et al. | 704/258 |
| 2008/0285388 | A1 * | 11/2008 | Ohguri et al. | 367/198 |

FOREIGN PATENT DOCUMENTS

| | | |
|---|---|---|
| JP | 2006-324952 | 11/2006 |
| WO | 2007/138503 | 12/2007 |

OTHER PUBLICATIONS

"An Eyes-Free User Interface Controlled by Finger Snaps", Vesa et al., pp. 262-265, Proc. of the 8th Int. Conference on Digital Audio Effects (DAFx'05) Madrid, Spain, Sep. 20-22, 2005.
"Voice Remote Controlled TV Set", Sugaya et al., 1979 IEEE, pp. 392-395.

* cited by examiner

*Primary Examiner* — Thomas Tarcza
*Assistant Examiner* — James Hulka
(74) *Attorney, Agent, or Firm* — Louis Woo

(57) ABSTRACT

An apparatus includes sound sensors for converting sounds into electric signals. An angular position of a sound source of a first sound wave as seen from the apparatus is determined on the basis of moments of arrival of the first sound wave at the respective sound sensors which are represented by the electric signals. An angular position of a sound source of a second sound wave as seen from the apparatus is determined on the basis of moments of arrival of the second sound wave at the respective sound sensors which are represented by the electric signals. Calculation is given of a relative angle between the determined angular position of the sound source of the first sound wave and the determined angular position of the sound source of the second sound wave. A condition of the apparatus is controlled in response to the calculated relative angle.

14 Claims, 22 Drawing Sheets

FIG. 10

| (I-1) | (I-2) | ANGLE | DIRECTION |
|---|---|---|---|
| 0 | 0 | 0 | CENTER |
| 0 | 1 | $-\theta j$ | LEFT |
| 1 | 0 | $\theta j$ | RIGHT |
| 1 | 1 | NOT COMPUTED | INEFFECTIVE |

FIG. 25
FIG. 26
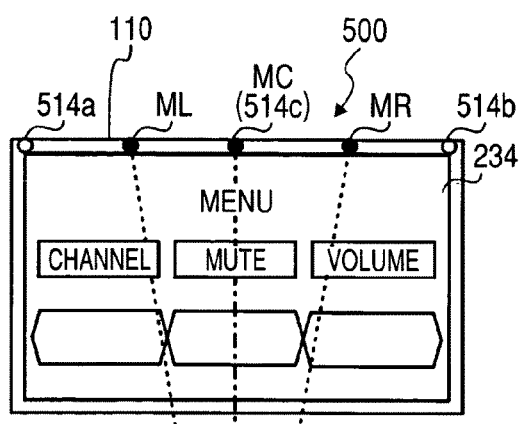
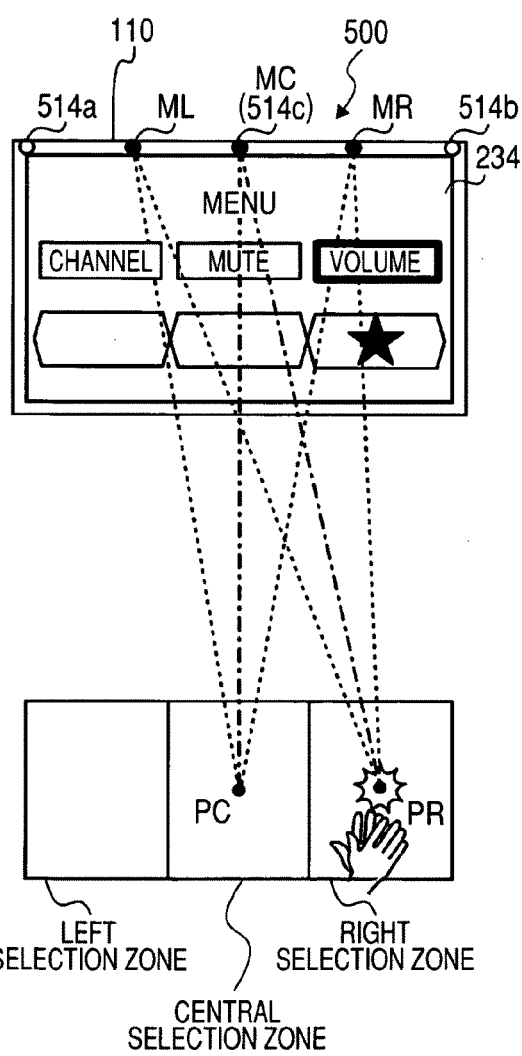

ELECTRONIC APPARATUS OPERABLE BY EXTERNAL SOUND

BACKGROUND OF THE INVENTION

1. Field of the Invention

This invention relates to an electronic or electric apparatus such as a television receiver, an audio apparatus, an air conditioner, a personal computer, a music player, a car navigation apparatus, a game machine, or a DVD player which can be operated or controlled in response to external sound generated by a user. Furthermore, this invention relates to a method allowing a user to operate an apparatus through the generation of sound.

2. Description of the Related Art

It is known to equip an electronic apparatus such as a television receiver or an audio apparatus with a wireless remote control system having a transmitting unit and a receiving unit. In general, the transmitting unit is located outside the body of the electronic apparatus. On the other hand, the receiving unit is provided on the body of the electronic apparatus. The transmitting unit can be operated by a user. The transmitting unit sends a wireless signal of a user's command toward the receiving unit when being operated by the user. The receiving unit catches the wireless signal, and derives the user's command therefrom. Then, the electronic apparatus is operated or controlled in accordance with the user's command.

Japanese patent application publication number 2006-324952 discloses a television receiver equipped with a sound-responsive system for allowing the posture of a display to follow the position of a target user. The sound-responsive system includes a mechanism for changing the posture of the display, a plurality of separate microphones fixedly located in the front of the display, a memory storing previously-registered speech patterns of a target user, an analyzer, and a controller. The microphones convert received sounds into corresponding electric signals. The analyzer collates the electric signals with the previously-registered speech patterns to detect a speech given by the target user. As the target user moves relative to the display while uttering, there occurs a change in phase difference between the electric signals generated by the microphones regarding the detected speech by the target user. The analyzer senses the phase difference change, and thereby detects the movement of the target user. The controller actuates the display-posture changing mechanism in response to the detected movement of the target user, thereby making the posture of the display follow the position of the target user.

Thus, the sound-responsive system in Japanese application 2006-324952 controls only the single condition, that is, the posture of the display of the television receiver in response to the sound generated by the target user.

A typical wireless remote control system for an electronic apparatus is designed to control various conditions of the electronic apparatus. Accordingly, it is desirable to control various conditions of an electronic apparatus in response to sound generated by a user.

SUMMARY OF THE INVENTION

It is a first object of this invention to provide an electronic or electric apparatus, various conditions of which can be controlled in response to sound generated by a user.

It is a second object of this invention to provide a method allowing a user to easily operate an apparatus through the generation of sound.

A first aspect of this invention provides an apparatus comprising at least two sound sensors for converting sounds into electric signals; means for determining an angular position of a sound source of a first sound wave as seen from the apparatus on the basis of moments of arrival of the first sound wave at the respective sound sensors which are represented by the electric signals, and determining an angular position of a sound source of a second sound wave as seen from the apparatus on the basis of moments of arrival of the second sound wave at the respective sound sensors which are represented by the electric signals, the second sound wave following the first sound wave in time domain; means for calculating a relative angle between the determined angular position of the sound source of the first sound wave and the determined angular position of the sound source of the second sound wave; and means for controlling a condition of the apparatus in response to the calculated relative angle.

A second aspect of this invention is based on the first aspect thereof, and provides an apparatus wherein the controlling means comprises means for deciding which of selection zones contains the calculated relative angle, and means for controlling the condition of the apparatus in accordance with a result of said deciding.

A third aspect of this invention is based on the first aspect thereof, and provides an apparatus wherein the controlling means comprises means for deciding whether or not the calculated relative angle is within an effective range, and means for controlling the condition of the apparatus only when the deciding means decides that the calculated relative angle is within the effective range.

A fourth aspect of this invention provides an apparatus comprising at least three sound sensors for converting sounds into electric signals; means for determining a position of a sound source of a first sound wave as seen from the apparatus on the basis of moments of arrival of the first sound wave at the respective sound sensors which are represented by the electric signals, and determining a position of a sound source of a second sound wave as seen from the apparatus on the basis of moments of arrival of the second sound wave at the respective sound sensors which are represented by the electric signals, the second sound wave following the first sound wave in time domain; means for calculating a relative position between the determined position of the sound source of the first sound wave and the determined position of the sound source of the second sound wave; and means for controlling a condition of the apparatus in response to the calculated relative position.

A fifth aspect of this invention is based on the fourth aspect thereof, and provides an apparatus wherein the controlling means comprises means for deciding which of selection zones contains the calculated relative position, and means for controlling the condition of the apparatus in accordance with a result of said deciding.

A sixth aspect of this invention is based on the fourth aspect thereof, and provides an apparatus wherein the controlling means comprises means for deciding whether or not the calculated relative position is within an effective range, and means for controlling the condition of the apparatus only when the deciding means decides that the calculated relative position is within the effective range.

A seventh aspect of this invention is based on the sixth aspect thereof, and provides an apparatus wherein the effective range angularly extends from a first given angle less than an angle of the determined position of the sound source of the first sound wave to a second given angle greater than the angle of the determined position of the sound source of the first sound wave, and extends in a distance-wise direction up to a given distance greater than the distance between the apparatus and the determined position of the sound source of the first sound wave.

An eighth aspect of this invention is based on the sixth aspect thereof, and provides an apparatus wherein the effective range is a circle having a given radius and centered at the determined position of the sound source of the first sound wave.

A ninth aspect of this invention is based on the first aspect thereof, and provides an apparatus further comprising a monitor, means for indicating controllable contents of the condition of the apparatus on the monitor in a manner such that the indicated controllable contents are related with an angular position at which a sound wave is to be generated, and means for indicating the calculated relative angle on the monitor.

A tenth aspect of this invention is based on the first aspect thereof, and provides an apparatus further comprising loudspeakers, means for generating vocal messages from the loudspeakers which indicate controllable contents of the condition of the apparatus on the monitor in a manner such that the indicated controllable contents are related with an angular position at which a sound wave is to be generated, and means for causing the loudspeakers to present a sound image located at a position corresponding to the calculated relative angle.

An eleventh aspect of this invention is based on the first aspect thereof, and provides an apparatus wherein the controlling means comprises means for deciding whether or not the calculated relative angle is within an effective range, and means for controlling the condition of the apparatus only when the deciding means decides that the calculated relative angle is within the effective range, and wherein the effective range angularly extends from a first given angle less than an angle of the determined angular position of the sound source of the first sound wave to a second given angle greater than the angle of the determined angular position of the sound source of the first sound wave.

A twelfth aspect of this invention is based on the fourth aspect thereof, and provides an apparatus further comprising a monitor, means for indicating controllable contents of the condition of the apparatus on the monitor in a manner such that the indicated controllable contents are related with a position at which a sound wave is to be generated, and means for indicating the calculated relative position on the monitor.

A thirteenth aspect of this invention is based on the fourth aspect thereof, and provides an apparatus further comprising loudspeakers, means for generating vocal messages from the loudspeakers which indicate controllable contents of the condition of the apparatus on the monitor in a manner such that the indicated controllable contents are related with a position at which a sound wave is to be generated, and means for causing the loudspeakers to present a sound image located at a position corresponding to the calculated relative position.

A fourteenth aspect of this invention provides a method of operating an apparatus having a monitor. The method comprises the steps of detecting a first sound reaching the apparatus; displaying a picture on the monitor when the first sound is detected, the picture having portions indicating controllable items respectively; detecting a position of a source of the detected first sound; setting a group of selection zones substantially centered at the detected position of the source of the detected first sound, the selection zones extending in places corresponding to positions of the portions of the picture respectively; detecting a second sound reaching the apparatus after the first sound is detected; detecting a position of a source of the detected second sound; deciding which of the selection zones contains the detected position of the source of the detected second sound; and deciding which of the controllable items is selected in accordance with a result of deciding which of the selection zones contains the detected position of the source of the detected second sound.

BRIEF DESCRIPTION OF THE DRAWINGS

FIG. 10 is a diagram of the relation among an angle of a sound source which is detected by a sound-source detecting block in FIG. 5, extended pulse signals I-1 and I-2 in FIGS. 6 and 7, and a measured direction of the sound source.

FIG. 25 is a diagram of a front face of the apparatus in FIG. 19, a menu picture displayed by a monitor in the apparatus, and a clap or claps generated by a user.

FIG. 26 is a diagram of the front face of the apparatus in FIG. 19, the menu picture displayed by the monitor in the apparatus, a clap generated by the user, a star mark superimposed on the menu picture at a position corresponding to a relative position of a sound source of the clap, a picture indicative of the selection of sound-volume control which is superimposed on the menu picture, and selection zones.

DETAILED DESCRIPTION OF THE INVENTION

First Embodiment

Figure 1:
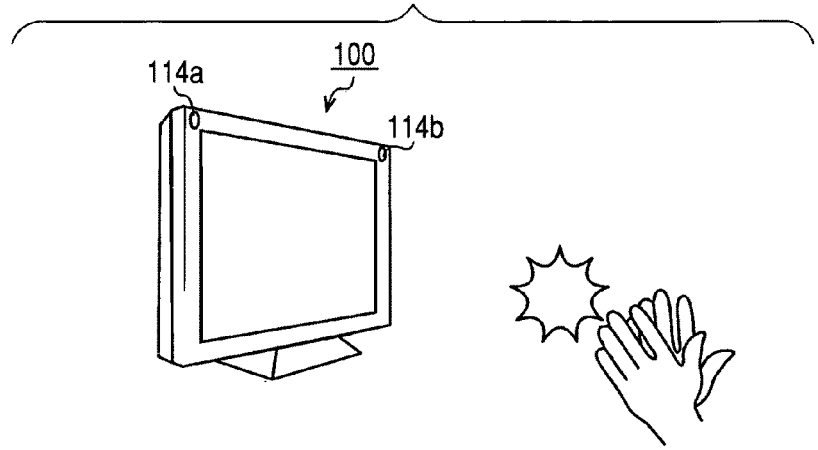
FIG. 1 is a perspective view of an electronic or electric apparatus according to a first embodiment of this invention.

With reference to FIG. 1, an electronic or electric apparatus 100 in a first embodiment of this invention includes at least two sound sensors, sound-to-electric transducers, or microphones 114a and 114b. The electronic or electric apparatus 100 is, for example, a television receiver. The electronic or electric apparatus 100 may be an audio apparatus, an air conditioner, a personal computer, a music player, a car navigation apparatus, a game machine, or a DVD player.

The television receiver 100 can be operated or controlled in response to sounds or claps generated by a user on a remote control basis. The sound-responsive control is given of various conditions of the television receiver 100 such as a condition of whether a monitor therein should be in its on state or its off state, a condition of whether or not a menu picture should be displayed by the monitor, a condition of which of items in the menu picture should be selected, a condition of whether a currently received television channel should be changed by one channel up or one channel down, and a condition of whether the volume of sounds emitted from loudspeakers therein should be changed by one level up or one level down.

The television receiver 100 has a rectangular front face where a monitor surface (a display surface) extends. Preferably, the sound sensors 114a and 114b are provided on the upper left corner and the upper right corner of the front face of the television receiver 100, respectively. In this case, the sound sensors 114a and 114b are horizontally spaced from each other. The sound sensors 114a and 114b may be replaced by three or more sound sensors.

As will be made clear later, various conditions of the television receiver 100 (for example, monitor power on/off, indication of a menu picture, selection of an item in the indicated menu, received channel up or down, and sound volume up or down) can be controlled in response to sounds or claps generated by a user.

Figure 2:
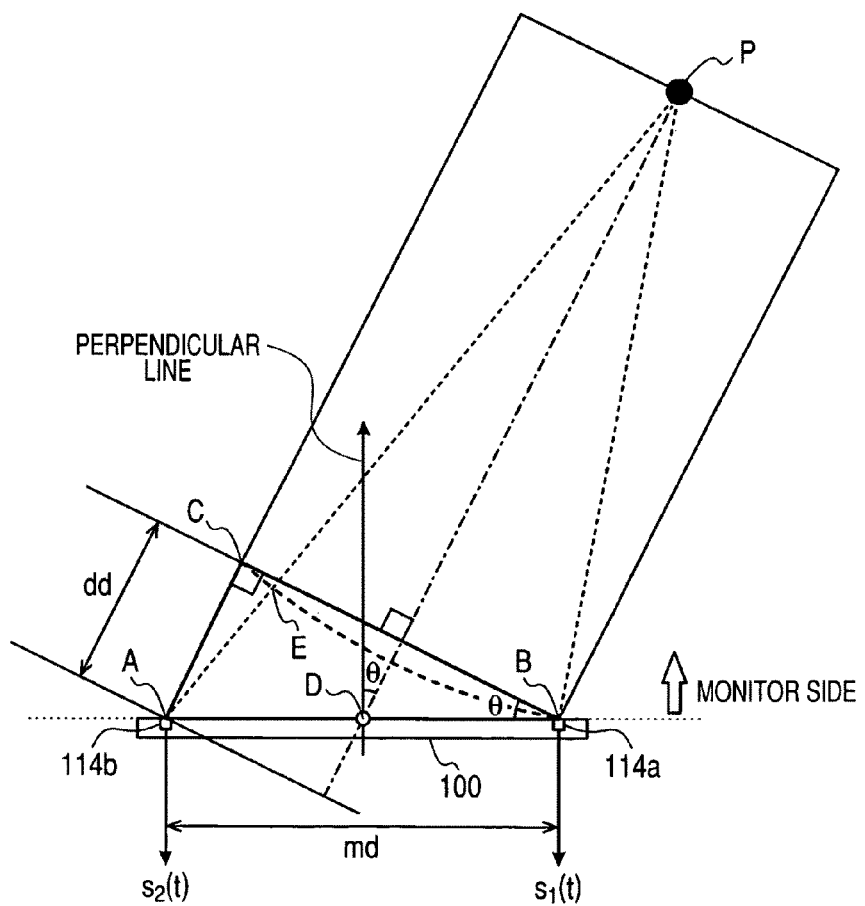
FIG. 2 is a diagram of the positional and angular relations among the apparatus in FIG. 1, sound sensors in the apparatus, and a sound source generating a sound wave reaching the sound sensors as seen from above.

With reference to FIG. 2, the position where a sound is generated by the user, that is, the position of a sound source is denoted by the dot P. The sound sensor 114a is located at a point B on a left edge part of the front face of the television receiver 100. The sound sensor 114b is located at a point A on a right edge part of the front face of the television receiver 100. The sound sensors 114a and 114b are equidistant from the center D of the front face of the television receiver 100. The television receiver center D coincides with the center between the points A and B of the sound sensors 114a and 114b. For example, the user claps his or her hands at the position P to generate a pulse-like sound. The generated sound propagates from the position P to the sound sensors 114a and 114b.

Detection is made as to the direction of the source of the pulse-like sound (the clap) received by the sound sensors 114a and 114b as seen from the center D of the front face of the television receiver 100. Calculation is given of the angle (angular position) of the sound source which corresponds to the detected direction.

The usual distance between the front face of the television receiver 100 and the viewer's position (the user's position) is equal to three to five times the screen height of the television receiver 100. In view of this fact and a harmony with an accuracy of the calculation of the angle (angular position) of the sound source, it is good to approximate the propagating wave of the clap to a plane wave emitted from a line segment containing the position P. According to this approximation, the plane wave emitted from the line segment containing the position P toward the front face of the television receiver 100 reaches a point C when meeting the sound sensor 114a at the point B. There are parallel lines which pass through the points A and B of the sound sensors 114a and 114b respectively, and which extend in parallel with the line segment PD. The point C is on the line passing through the point A of the sound sensor 114b and being in parallel with the line segment PD. The line segment BC is perpendicular to the line segment PD.

In fact, the wave of the clap propagating from the sound-source position P toward the front face of the television receiver 100 is a spherical wave. When the spherical wave meets the sound sensor 114a at the point B, the fronts of the spherical wave extend along the circular arc about the position P and connecting the points B and C. An error caused by the approximation of the spherical wave to the plane wave corresponds to the difference in length between the line segment AC and the line segment AE, where E denotes a point of intersection of the line segment AP and the foregoing circular arc. As shown in FIG. 2, this error is small. The error is negligible at a required accuracy of the calculation of the angle (angular position) of the sound source. Thus, the approximation of the spherical wave to the plane wave provides a sufficient accuracy.

In the case where the wave of the clap propagating from the line segment containing the point P toward the front face of the television receiver 100 is approximated to a plane wave, the length "dd" of the line segment AC corresponds to the difference (time difference) between the moment of the encounter of the plane wave with the sound sensor 114a at the point B and the moment of the encounter of the plane wave with the sound sensor 114b at the point A. The sound sensors 114a and 114b convert the received clap into electric sound signals respectively. The time difference corresponding to the length "dd" of the line segment AC is obtained from the sound signals generated by the sound sensors 114a and 114b. Then, the angle (angular position) of the source of the clap is calculated as follows.

A sound signal generated by the sound sensor 114a and representing a clap is expressed by $s_1(t)$ and a sound signal generated by the sound sensor 114b and representing the clap is expressed by $s_2(t)$, where "t" denotes time. The sound signals $s_1(t)$ and $s_2(t)$ are in a relation as:

$$s_2(t) = s_1(t - t_{dd}) \quad (1)$$

where "$t_{dd}$" denotes the clap-arrival time difference, that is, the difference between the moment of the encounter of the clap with the sound sensor 114a and the moment of the encounter of the clap with the sound sensor 114b.

The speed of sound is denoted by "c". The distance between the sound sensors 114a and 114b is denoted by "md". The angle between the line segment PD and a perpendicular line with respect to the front face of the television receiver 100 which passes through the point D is labeled an angle (angular position) θ of the sound source as seen from the center D of the front face of the television receiver 100. These parameters and the clap-arrival time difference "$t_{dd}$" are in a relation as:

$$t_{dd} = md \cdot \sin \theta / c \quad (2)$$

Accordingly, the angle θ of the sound source as seen from the center D of the front face of the television receiver 100 is given by the following equation:

$$\theta = \arcsin(t_{dd} \cdot c / md) \quad (3)$$

In the case where the television receiver 100 is of the 42-inch type, the distance "md" between the sound sensors 114a and 114b is preferably equal to about 100 cm. The sound speed "c" is equal to about 340 m/s. Since the inter-sound-sensor distance "md" and the sound speed "c" are known, the angle θ of the sound source can be determined on the basis of the clap-arrival time difference "$t_{dd}$" according to the equation (3). Thus, the angle θ of the sound source can be calculated provided that the clap-arrival time difference "$t_{dd}$" is measured.

Figure 3:
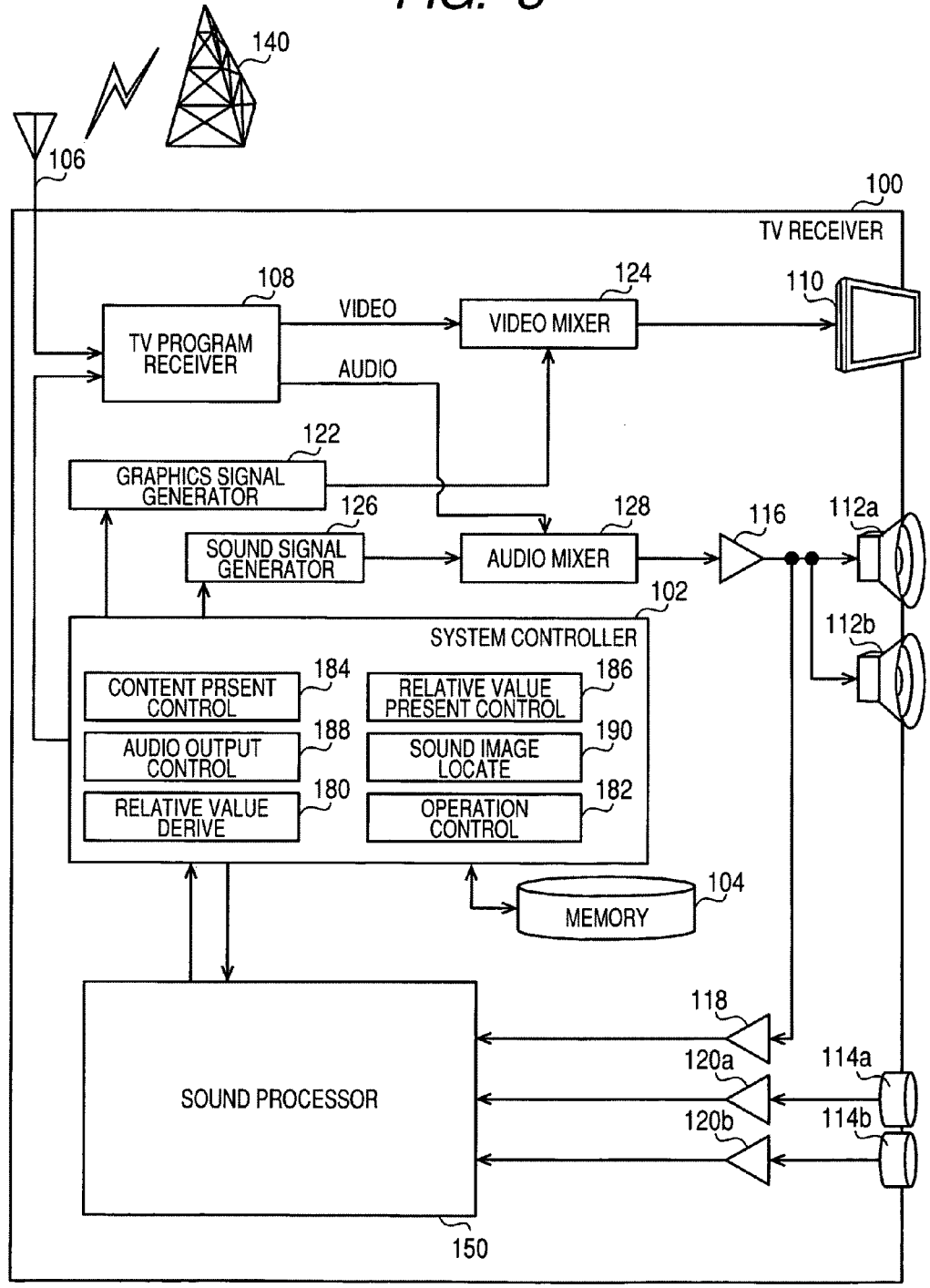
FIG. 3 is a block diagram of the apparatus in FIG. 1.

With reference to FIG. 3, the television receiver 100 includes a system controller 102, a memory or storage unit 104, a television program receiver 108, a monitor or display 110, a left loudspeaker 112a, a right loudspeaker 112b, the left sound sensor 114a, the right sound sensor 114b, a main amplifier 116, an output amplifier 118, audio amplifiers 120a and 120b, a graphics signal generator 122, a video mixer 124, a sound signal generator 126, an audio mixer 128, and a sound processor 150.

A power supply of the television receiver 100 except the monitor 110 is separate from a power supply of the monitor 110. The power supply of the monitor 110 can be changed between its on state and its off state while the power supply of the television receiver 100 remains in its on state.

The system controller 102 includes a CPU. The memory unit (storage unit) 104 is connected with the system controller 102. The memory unit 104 includes a ROM, a RAM, an EEPROM, a nonvolatile RAM, a flash memory, or a hard disk drive unit. The memory unit 104 stores a computer program for controlling the CPU within the system controller 102. The computer program is designed to enable the system controller 102 (the CPU) to control the whole of the television receiver 100. The memory unit 104 is used to store a signal representative of a reference angle (a reference sound-source angle or angular position) which is generated by the system controller 102.

The system controller 102 can change the power supply of the monitor 110 between its on state and its off state. The system controller 102 can control the memory unit 104, the television program receiver 108, the main amplifier 116, the graphics signal generator 122, the video mixer 124, the sound signal generator 126, the audio mixer 128, and the sound processor 150.

An antenna 106 is connected with the television program receiver 108. The antenna 106 catches radio waves (RF signals) sent from a broadcasting station 140. The caught RF signals are fed to the television program receiver 108 from the antenna 106. Radio waves (RF signals) may be fed to the television program receiver 108 from a cable television station (not shown) through a cable.

The television program receiver 108 includes a tuner. The television program receiver 108 decodes the RF signals into baseband television signals of different channels, and selects one from the channels (one from the baseband television signals). The television program receiver 108 separates the selected-channel television signal into a selected-channel video signal and a selected-channel audio signal. The television program receiver 108 outputs the selected-channel video signal and the selected-channel audio signal to the video mixer 124 and the audio mixer 128 respectively. As will be made clear later, the system controller 102 operates to control the channel selection by the television program receiver 108 in response to pulse-like sounds or claps generated by a user and received by the sound sensors 114a and 114b.

The graphics signal generator 122 is connected with the system controller 102. The graphics signal generator 122 produces a graphics signal while being controlled by the system controller 102. The graphics signal generator 122 outputs the produced graphics signal to the video mixer 124. The graphics signal represents one or more selected from different graphics pictures including a menu picture, a channel control picture, a sound-volume control picture, a picture indicative of a detected relative sound-source angle, and a picture indicative of which of items in the menu picture is selected.

The selected-channel video signal outputted from the television program receiver 108 can pass through the video mixer 124 before reaching the monitor 110. A stream of selected-channel television program pictures (broadcast program pictures) represented by the selected-channel video signal can be indicated by the monitor 110.

The graphics signal outputted from the graphics signal generator 122 can pass through the video mixer 124 before reaching the monitor 110. A graphics picture represented by the graphics signal can be indicated by the monitor 110.

The sound signal generator 126 is connected with the system controller 102. The sound signal generator 126 produces a sound signal while being controlled by the system controller 102. The sound signal generator 126 outputs the produced sound signal to the audio mixer 128. The sound signal represents one or more selected from different sounds including vocal messages, operation-denoting sounds, and an alarm sound.

The selected-channel audio signal outputted from the television program receiver 108 can pass through the audio mixer 128 before traveling through the main amplifier 116 and then reaching the loudspeakers 112a and 112b. The selected-channel audio signal is converted into corresponding sounds by the loudspeakers 112a and 112b. The sounds are emitted from the loudspeakers 112a and 112b as main sounds. Preferably, the loudspeakers 112a and 112b are provided on left and right edge areas in the front face of the television receiver 100, respectively.

The sound signal outputted from the sound signal generator 126 can pass through the audio mixer 128 before traveling through the main amplifier 116 and then reaching the loudspeakers 112a and 112b. The sound signal is converted into a corresponding sound by the loudspeakers 112a and 112b. The sound is emitted from the loudspeakers 112a and 112b as a main sound.

The selected-channel audio signal outputted from the television program receiver 108 can travel to the sound processor 150 through the audio mixer 128, the main amplifier 116, and the output amplifier 118. The sound signal outputted from the sound signal generator 126 can travel to the sound processor 150 through the audio mixer 128, the main amplifier 116, and the output amplifier 118.

The sound sensors 114a and 114b convert applied sound waves into sound signals, and output the sound signals to the audio amplifiers 120a and 120b respectively. Preferably, the sound sensors 114a and 114b are provided on left and right edge areas in the front face of the television receiver 100, respectively. In the case where the monitor 110 is of the 42-inch size, the distance between the sound sensors 114a and 114b is preferably equal to about 100 cm. In the case where the monitor 110 is of the 26-inch size, the distance between the sound sensors 114a and 114b is preferably equal to about 60 cm.

The television receiver 100 responds to a sound such as a clap, a knock, a plosive, an utterance, or a word generated by the user. Preferably, the sound takes a pulse-like waveform. The sound is received by the sound sensors 114a and 114b.

The audio amplifier 120a enlarges the sound signal outputted from the left sound sensor 114a, and outputs the enlarged sound signal to the sound processor 150. The audio amplifier 120b enlarges the sound signal outputted from the right sound sensor 114b, and outputs the enlarged sound signal to the sound processor 150.

The sound processor 150 detects the angle (angular position) of a source of a sound represented by the sound signals outputted from the audio amplifiers 120a and 120b. The detected angle is measured from the perpendicular line with respect to the front face of the television receiver 100.

Figure 4:
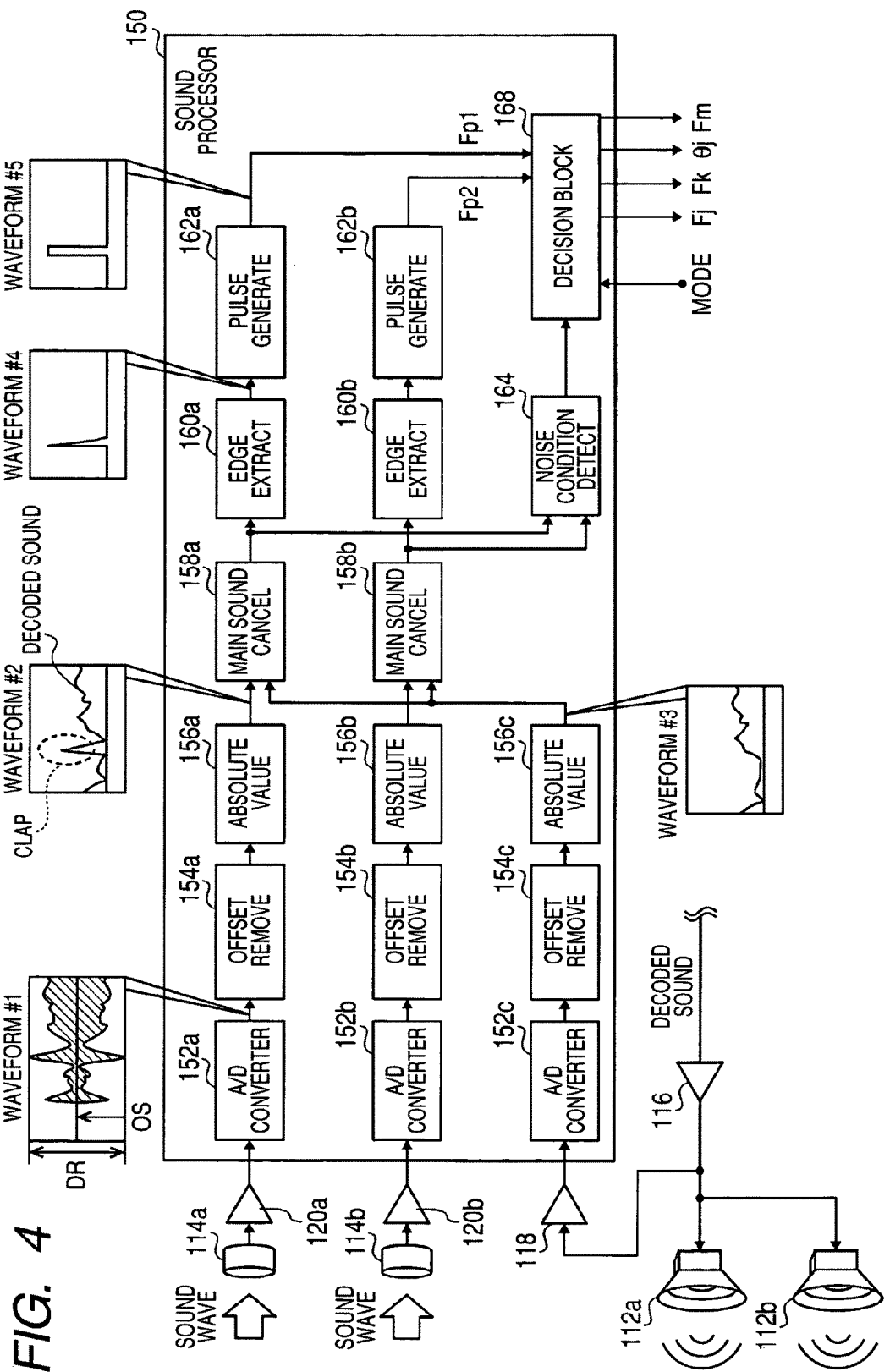
FIG. 4 is a block diagram of a sound processor in FIG. 4.

As shown in FIG. 4, the sound processor 150 includes A/D converters 152a, 152b, and 152c. The A/D converter 152a changes the sound signal outputted by the audio amplifier 120a into a corresponding digital sound signal, and outputs the digital sound signal. The A/D converter 152b changes the sound signal outputted by the audio amplifier 120b into a corresponding digital sound signal, and outputs the digital sound signal. The A/D converter 152c changes a sound signal outputted by the output amplifier 118 into a corresponding digital sound signal, and outputs the digital sound signal. The sound signal outputted by the output amplifier 118 consists of the selected-channel audio signal outputted from the television program receiver 108 and the sound signal outputted from the sound signal generator 126. As previously explained, the selected-channel audio signal outputted from the television program receiver 108 and the sound signal outputted from the sound signal generator 126 are converted by the loudspeakers 112a and 112b into main sounds emitted therefrom. Thus, the sound signal outputted by the output amplifier 118 represents sounds equivalent to those (the main sounds) emitted from the loudspeakers 112a and 112b.

As will be made clear later, various blocks for processing the digital sound signals generated by the A/D converters 152a, 152b, and 152c are in the sound processor 150. These blocks are implemented by discrete digital circuits or a combination of a computer (or a DSP) and a control program for the computer. In the latter case, the control program is designed to enable the computer to implement the blocks.

With reference to FIG. 4, the analog waveform #1 represented by the digital sound signal outputted from the A/D converter 152a is limited to within the dynamic range DR of the A/D converter 152a. The analog waveform #1 is centered at an offset level OS. When the sound sensor 114a is in a silent environment, the analog waveform #1 is fixed to the offset level OS. Similarly, the analog waveform represented by the digital sound signal outputted from the A/D converter 152b or 152c is limited to within the dynamic range DR of the A/D converter 152b or 152c.

In the sound processor 150, an offset-component removing block 154a includes a high-pass filter which removes an offset component from the digital sound signal outputted by the A/D converter 152a to generate an offset-free digital sound signal. Similarly, an offset-component removing block 154b includes a high-pass filter which removes an offset component from the digital sound signal outputted by the A/D converter 152b to generate an offset-free digital sound signal. An offset-component removing block 154c includes a high-pass filter which removes an offset component from the digital sound signal outputted by the A/D converter 152c to generate an offset-free digital sound signal.

In the sound processor 150, an absolute-value block 156a takes an absolute value of the offset-free digital sound signal generated by the offset-component removing block 154a, and thereby generates an absolute-value digital signal representing an analog waveform #2 equivalent to the positive-side envelope of the analog waveform #1 represented by the digital sound signal outputted from the A/D converter 152a. Similarly, an absolute-value block 156b takes an absolute value of the offset-free digital sound signal generated by the offset-component removing block 154b, and thereby generates an absolute-value digital signal. An absolute-value block 156c takes an absolute value of the offset-free digital sound signal generated by the offset-component removing block 154c, and thereby generates an absolute-value digital signal. Since the sound signal outputted by the output amplifier 118 represents sounds equivalent to those emitted from the loudspeakers 112a and 112b as main sounds, the absolute-value digital signal generated by the absolute-value block 156c corresponds to the main sounds. Specifically, the absolute-value digital signal generated by the absolute-value block 156c represents an analog waveform #3 corresponding to the main sounds (emitted from the loudspeakers 112a and 112b).

Portions of sounds emitted from the loudspeakers 112a and 112b propagate to the sound sensors 114a and 114b on an unwanted feedback basis. As a result, the analog waveform #2 represented by the absolute-value digital signal generated by the absolute-value block 156a reflects not only a sound (for example, a clap) generated by the user but also main sounds emitted from the loudspeakers 112a and 112b. Similarly, the analog waveform represented by the absolute-value digital signal generated by the absolute-value block 156b reflects not only the sound generated by the user but also the main sounds emitted from the loudspeakers 112a and 112b.

In the sound processor 150, a main-sound canceling block 158a subtracts the absolute-value digital signal generated by the absolute-value block 156c from the absolute-value digital signal generated by the absolute-value block 156a, and thereby removes, from the absolute-value digital signal generated by the absolute-value block 156a, components corresponding to the main sounds emitted from the loudspeakers 112a and 112b to generate a main-sound-free digital signal. Similarly, a main-sound canceling block 158b subtracts the absolute-value digital signal generated by the absolute-value block 156c from the absolute-value digital signal generated by the absolute-value block 156b, and thereby removes, from the absolute-value digital signal generated by the absolute-value block 156b, components corresponding to the main sounds emitted from the loudspeakers 112a and 112b to generate a main-sound-free digital signal.

Preferably, the combination of the offset-component removing block 154c and the absolute-value block 156c implements waveform and signal-delay compensation in view of conditions of sound transmission lines extending from the loudspeakers 112a and 112b to the sound sensors 114a and 114b. The waveform and signal-delay compensation matches the absolute-value digital signal generated by the absolute-value block 156c with the main-sound-corresponding components of the absolute-value digital signal generated by the absolute-value block 156a or 156b on a waveform and timing basis.

A pulse-like sound or a clap generated by the user causes edges in the analog waveforms represented by the main-sound-free digital signals generated by the main-sound canceling blocks 158a and 158b. In the sound processor 150, an edge extracting block 160a extracts, from the main-sound-free digital signal generated by the main-sound canceling block 158a, components corresponding to every edge in the analog waveform represented by the main-sound-free digital signal to generate an edge digital signal representing an analog waveform #4 having only the edge. Similarly, an edge extracting block 160b extracts, from the main-sound-free digital signal generated by the main-sound canceling block 158b, components corresponding to every edge in the analog waveform represented by the main-sound-free digital signal to generate an edge digital signal representing an analog waveform having only the edge. The edges in the analog waveforms represented by the edge digital signals generated by the edge extracting blocks 160a and 160b denote the pulse-like sound or the clap generated by the user. The edge extracting blocks 160a and 160b remove noise components such as signal components unrelated to pulse-like sounds (claps) and signal components corresponding to remaining broadcast audio.

In the sound processor 150, a pulse generating block 162a is triggered by every edge in the analog waveform represented by the edge digital signal generated by the edge extracting block 160a, and thereby generates a pulse digital signal representing an analog waveform #5 having only a pulse with a prescribed width (a prescribed time length). The pulse digital signal is fed from the pulse generating block 162a to a decision block 168 as a flag Fp1 indicating the detection of the pulse-like sound or the clap generated by the user. Similarly, a pulse generating block 162b is triggered by every edge in the analog waveform represented by the edge digital signal generated by the edge extracting block 160b, and thereby generates a pulse digital signal representing an analog waveform having only a pulse with the prescribed width (the prescribed time length). The pulse digital signal is fed from the pulse generating block 162b to the decision block 168 as a flag Fp2 indicating the detection of the pulse-like sound or the clap generated by the user. The clap detection flag Fp1 relates to the left sound sensor 114a. The clap detection flag Fp2 relates to the right sound sensor 114b. Each of the clap detection flags Fp1 and Fp2 has a duration equal to the aforesaid prescribed pulse width.

In the sound processor 150, a noise condition detecting block 164 detects the level of noise in the surroundings of the television receiver 100 from the main-sound-free digital signals generated by the main-sound canceling blocks 158a and 158b. The noise condition detecting block 164 compares the detected noise level with a predetermined reference level. When the detected noise level is greater than the reference level, the noise condition detecting block 164 generates an unacceptable-noise-condition flag indicating that the surrounding noise condition is unfit for the detection of a pulse-like sound or a clap generated by the user. The noise condition detecting block 164 feeds the unacceptable-noise-condition flag to the decision block 168.

The decision block 168 recognizes or detects every pulse-like sound or clap generated by the user on the basis of the clap detection flags Fp1 and Fp2. The decision block 168 notifies the detection of the pulse-like sound or clap to the system controller 102. In addition, the decision block 168 determines the angle (angular position) of the source of the detected pulse-like sound or clap on the basis of the clap detection flags Fp1 and Fp2. The determined angle is measured from the perpendicular line with respect to the front face of the television receiver 100. The decision block 168 informs the system controller 102 of the determined sound-source angle. Specifically, the decision block 168 calculates the timing difference between the clap detection flags Fp1 and Fp2, and determines the angle (angular position) of the source of the pulse-like sound or clap on the basis of the calculated timing difference. The decision block 168 feeds data representative of the determined angle of the sound source to the system controller 102.

Furthermore, the decision block 168 decides whether or not a clap (a pulse-like sound) is iterated at least a prescribed number of times at shorter than a prescribed period. Regarding there are three or more successive claps, the decision block 168 decides whether or not the intervals between the claps are substantially equal. The decision block 168 notifies the results of these decisions to the system controller 102.

The decision block 168 generates a signal (decision result signal) representing one or more of the results of the aforesaid recognition or detection and the aforesaid decisions in response to a mode signal fed from the system controller 102. When the unacceptable-noise-condition flag is fed from the noise condition detecting block 164, the decision block 168 suspends the recognition or detection and the decisions and inhibits the feed of the decision result signal to the system controller 102.

Figure 5:
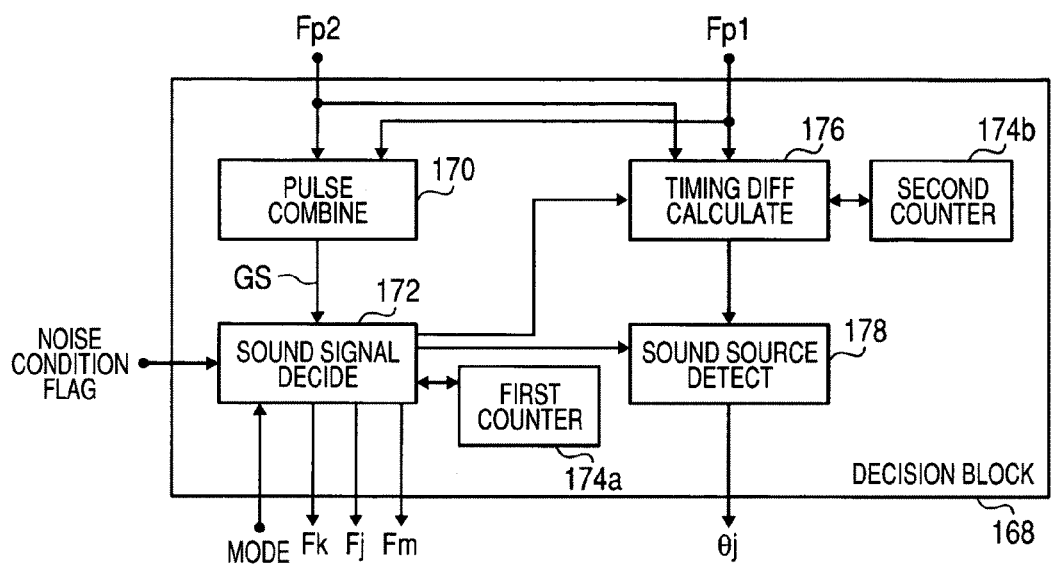
FIG. 5 is a block diagram of a decision block in FIG. 4.

As shown in FIG. 5, the decision block 168 includes a pulse combining block 170, a sound-signal deciding block 172, a first counter 174a, a second counter 174b, a timing-difference calculating block 176, and a sound-source detecting block 178.

Each time the user generates a clap (a pulse-like sound), the pulse generating blocks 162a and 162b generate clap detection flags Fp1 and Fp2 and feed them to the decision block 168. The clap detection pulse Fp1 is shown in the portions (A) and (D) of FIG. 6. The clap detection flag Fp2 is shown in the portions (B) and (E) of FIG. 6. The pulse combining block 170 in the decision block 168 combines the clap detection flags Fp1 and Fp2 through OR operation to generate a pulse combination signal GS having a waveform shown in the portion (G) of FIG. 6. The pulse combining block 170 feeds the pulse combination signal GS to the sound-signal deciding block 172. Operation of the decision block 168 is timing-controlled by a clock pulse signal shown in the portion (C) of FIG. 6.

Figure 6:
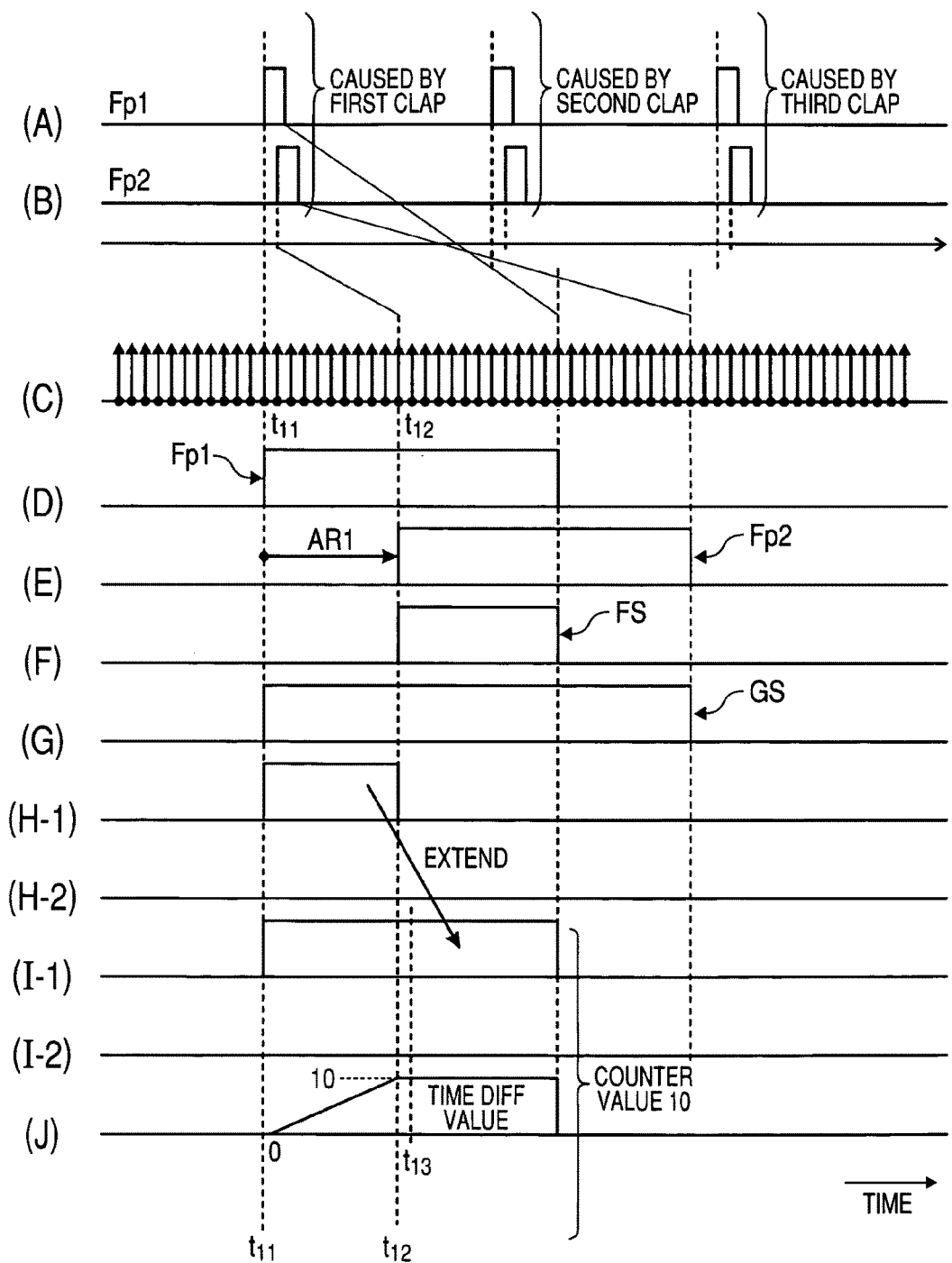
FIG. 6 is a time-domain diagram of various signals related to the decision block in FIG. 5 which occur in the case where every clap reaches the left sound sensor before reaching the right sound sensor in the apparatus of FIG. 1.

The clap detection flags Fp1 and Fp2 caused by the same clap start at time points $t_{11}$ and $t_{12}$, respectively. As previously mentioned, the clap detection pulses Fp1 and Fp2 relate to the left and right sound sensors 114a and 114b, respectively. In FIG. 6, the beginning point $t_{12}$ of the clap detection pulse Fp2 follows the beginning point $t_{11}$ of the clap detection pulse Fp1 in time domain. This timing relation means that the source of the clap is closer to the left sound sensor 114a than the right sound sensor 114b. In FIG. 6, the clap detection pulses Fp1 and Fp2 caused by the same clap partially overlap in time domain. Thus, the pulse combination signal GS changes from a low level state to a high level state at the beginning point $t_{11}$ of the clap detection pulse Fp1, and remains in the high level state until the ending point of the clap detection pulse Fp2. The pulse combination signal GS returns to the low level state at the ending point of the clap detection pulse Fp2. Accordingly, the pulse combination signal GS has one positive pulse for every clap generated by the user.

The pulse combining block 170 implements OR operation between the clap detection flags Fp1 and Fp2 to generate the pulse combination signal GS. Therefore, the generated pulse combination signal GS is effective as an indication of the detected clap even when one of the sound sensors 114a and 114b fails to sense the clap.

Alternatively, the pulse combining block 170 may implement AND operation between the clap detection flags Fp1 and Fp2 to generate a pulse combination signal FS instead of the pulse combination signal GS. In this case, the generated pulse combination signal FS has a waveform shown in the portion (F) of FIG. 6. The pulse combining block 170 feeds the pulse combination signal FS to the sound-signal deciding block 172. The pulse combination signal FS does not indicate the detection of the clap (the pulse-like sound) when one of the sound sensors 114a and 114b fails to sense the clap. Thus, the pulse combination signal FS restricts the operation of the decision block 168.

For attaining a high clap recognition rate, OR operation by the pulse combining block 170 is preferable to AND operation. For suppressing erroneous clap recognitions, AND operation by the pulse combining block 170 is preferable to OR operation.

The sound-signal deciding block 172 receives the pulse combination signal GS (or FS) from the pulse combining block 170. The sound-signal deciding block 172 receives the unacceptable-noise-condition flag from the pulse noise condition detecting block 164. The sound-signal deciding block 172 receives the mode signal from the system controller 102.

The mode signal indicates a mode chosen from a plurality of prescribed modes including an on/off mode and a selection up/down mode.

In the case where the chosen mode is the on/off mode, the sound processor 150 and the system controller 102 operate to change the power supply of the monitor 110 between its on state and its off state in response to the number of successive claps (pulse-like sounds) generated by the user. The power supply of the monitor 110 is changed to its on state in response to three successive claps. The power supply of the monitor 110 is changed to its off state in response to four successive claps.

In the case where the chosen mode is the selection up/down mode, the sound processor 150 and the system controller 102 operate to select a television receiver function or a television receiver condition in response to a clap (a pulse-like sound) or successive claps (pulse-like sounds) generated by the user.

Furthermore, the sound processor 150 and the system controller 102 operate to change the chosen mode from the on/off mode to the selection up/down mode in response to a plurality of successive claps (pulse-like sounds), for example, three successive claps generated by the user. The system controller 102 changes the chosen mode from the selection up/down mode to the on/off mode on a time-out basis.

In the case where the mode signal fed from the system controller 102 indicates that the on/off mode is chosen, the decision block 168 operates as follows. The first counter 174a manages state transitions in time domain. The first counter 174a generates a gate pulse signal for designating a prescribed or specified time region and detecting the period of the pulse combination signal GS (or FS) fed to the sound-signal deciding block 172 from the pulse combining block 170. The first counter 174a applies the gate pulse signal to the sound-signal deciding block 172.

Figure 8:
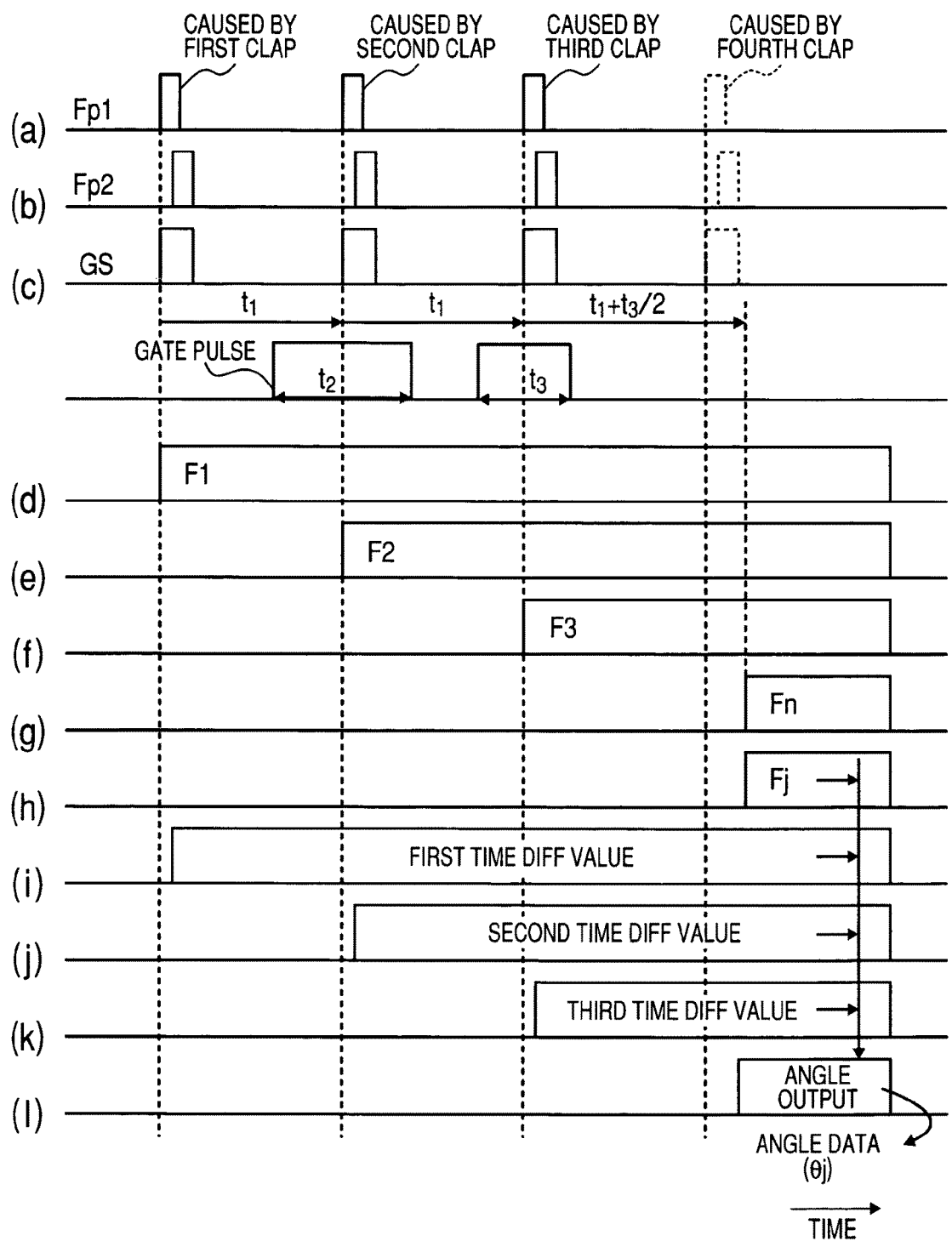
FIG. 8 is a time-domain diagram of various signals related to the decision block in FIG. 5 which occur in the case where three or more successive claps are detected.

With reference to FIG. 8, a pair of adjacent clap detection flags Fp1 and Fp2 occurs in response to every clap generated by the user. Thus, one positive pulse in the pulse combination signal GS occurs in response to every clap. The sound-signal deciding block 172 operates to decide whether or not a fourth positive pulse of the pulse combination signal GS occurs in a specified time from the moment of the occurrence of a third positive pulse thereof. When it is decided that a fourth positive pulse does not occur, the sound-signal deciding block 172 concludes that there are only three successive claps generated by the user. When it is decided that a fourth positive pulse occurs, the sound-signal deciding block 172 concludes that there are four successive claps generated by the user.

As shown in the portions (c) and (d) of FIG. 8, the sound-signal deciding block 172 sets a first-time detection flag F1 when the starting edge of a first positive pulse in the pulse combination signal GS arrives thereat. At the same time, the sound-signal deciding block 172 resets the first counter 174a and starts it counting pulses of the clock pulse signal. As shown in the portions (c) and (e) of FIG. 8, during a prescribed duration (a prescribed gate width) $t_2$ of a first positive pulse in the gate pulse signal fed from the first counter 174a, the sound-signal deciding block 172 sets a second-time detection flag F2 when the starting edge of a second positive pulse in the pulse combination signal GS arrives thereat. At the same time, the sound-signal deciding block 172 detects the time interval $t_1$ between the beginning points of the first and second positive pulses in the pulse combination signal GS by referring to the number of pulses counted by the first counter 174a. In addition, the sound-signal deciding block 172 resets the first counter 174a and restarts it counting pulses of the clock pulse signal. The sound-signal deciding block 172 stores a signal representative of the detected time interval $t_1$ into an internal memory.

The first positive pulse in the gate pulse signal is followed by a second positive pulse therein. The second positive pulse in the gate pulse signal has a duration (a gate width) $t_3$. The beginning point of the second positive pulse occurs when a term "$t_1-(t_3/2)$" measured from the moment of the setting of the second-time detection flag F2 expires. The ending point of the second positive pulse occurs when a term "$t_1+(t_3/2)$" measured from the moment of the setting of the second-time detection flag F2 expires.

As shown in the portions (c) and (f) of FIG. 8, during the duration $t_3$ of the second positive pulse in the gate pulse signal fed from the first counter 174a, the sound-signal deciding block 172 sets a third-time detection flag F3 when the starting edge of a third positive pulse in the pulse combination signal GS arrives thereat. At the same time, the sound-signal deciding block 172 detects the time interval $t_1$ between the beginning points of the second and third positive pulses in the pulse combination signal GS by referring to the number of pulses counted by the first counter 174a. In addition, the sound-signal deciding block 172 resets the first counter 174a and restarts it counting pulses of the clock pulse signal. The sound-signal deciding block 172 stores a signal representative of the detected time interval $t_1$ into the internal memory.

The sound-signal deciding block 172 measures the lapse of time from the moment of the setting of the third-time detection flag F3 by referring to the number of pulses counted by the first counter 174a. The sound-signal deciding block 172 decides whether or not the starting edge of a fourth positive pulse in the pulse combination signal GS arrives thereat until the measured lapse of time reaches a term "$t_1+(t_3/2)$". In the case where it is decided that the starting edge of a fourth positive pulse does not arrive, the sound-signal deciding block 172 sets a silence flag Fn at the moment of the expiry of the term "$t_1+(t_3/2)$" as shown in the portion (g) of FIG. 8. The silence flag Fn indicates the absence of a fourth clap. Preferably, the silence flag Fn has a prescribed duration. On the other hand, in the case where it is decided that the starting edge of a fourth positive pulse arrives, the sound-signal deciding block 172 sets a fourth-time detection flag F4.

When all the first-time detection flag F1, the second-time detection flag F2, the third-time detection flag F3, and the silence flag Fn are present, the sound-signal deciding block 172 concludes that there are only three successive claps generated by the user. In this case, the sound-signal deciding block 172 sets a decision result flag Fj indicative of detection of three successive claps and outputs the decision result flag Fj to the system controller 102 as shown in the portion (h) of FIG. 8. Preferably, the decision result flag Fj has a duration equal to that of the silence flag Fn. On the other hand, when the fourth-time detection flag F4 is present, a decision is made as to whether a fifth clap is present or absent in a way similar to the above. In the case where it is decided that a fifth clap is absent, the sound-signal deciding block 172 sets a silence flag Fn similarly to the above. When all the first-time detection flag F1, the second-time detection flag F2, the third-time detection flag F3, the fourth-time detection flag F4, and the silence flag Fn are present, the sound-signal deciding block 172 concludes that there are only four successive claps generated by the user. In this case, the sound-signal deciding block 172 sets a decision result flag Fk indicative of detection of four successive claps and outputs the decision result flag Fk to the system controller 102. Preferably, the decision result flag Fk has a prescribed duration.

In the case where the mode signal fed from the system controller 102 indicates that the selection up/down mode is chosen, the decision block 168 operates as follows. The sound-signal deciding block 172 in the decision block 168 recognizes or detects a clap generated by the user each time there occurs one positive pulse in the pulse combination signal GS (or FS) fed from the pulse combining block 170. The sound-signal deciding block 172 sets a decision result flag Fm indicative of detection of the clap and outputs the decision result flag Fm to the system controller 102. Preferably, the decision result flag Fm has a prescribed duration. Similarly to the previously-mentioned case, the sound-signal deciding block 172 sets a decision result flag Fj when three successive claps are detected. The sound-signal deciding block 172 outputs the decision result flag Fj to the system controller 102.

With reference back to FIG. 5, the timing-difference calculating block 176 in the decision block 168 computes the difference between the moments (the timings) of arrival of a clap at the sound sensors 114a and 114b on the basis of clap detection flags Fp1 and Fp2 fed from the pulse generating blocks 162a and 162b (see FIG. 4). The timing-difference calculating block 176 notifies the computed timing difference to the sound-source detecting block 178.

The difference between the moments (the timings) of arrival of a clap at the sound sensors 114a and 114b is denoted by the time difference between clap detection flags Fp1 and Fp2 caused by the clap.

In the portions (D) and (E) of FIG. 6, the phase difference between the clap detection flags Fp1 and Fp2 means a to-be-measured time difference therebetween which is denoted by the arrow AR1. The second counter 174b operates to count pulses of the clock pulse signal shown in the portion (C) of FIG. 6. The second counter 174b is controlled by the timing-difference calculating block 176 to measure the time difference AR1.

The timing-difference calculating block 176 implements AND operation between the clap detection flags Fp1 and Fp2 to generate a pulse combination signal FS having a waveform shown in the portion (F) of FIG. 6. The pulse combination signal FS indicates an extension time used by a first width extending block 206a mentioned later. During the time interval for which the pulse combination signal FS remains in its high level state, the timing-difference calculating block 176 holds fixed the counted pulse number given by the second counter 174b.

The timing-difference calculating block 176 generates a timing-difference pulse signal H-1 in response to the clap detection flags Fp1 and Fp2. As shown in the portions (D), (E), and (H-1) of FIG. 6, the timing-difference pulse signal H-1 assumes a high level state when the clap detection flags Fp1 and Fp2 are in its high level state and its low level state respectively. Otherwise, the timing-difference pulse signal H-1 assumes a low level state. Regarding the clap detection flags Fp1 and Fp2 caused by the same clap, the timing-difference pulse signal H-1 in its high level state indicates that the clap detection flag Fp1 precedes the clap detection pulse Fp2, and that the source of the clap is closer to the left sound sensor 114a than the right sound sensor 114b. The duration of the positive pulse in the timing-difference pulse signal H-1 indicates the to-be-measured time difference AR1.

During the time interval for which the timing-difference pulse signal H-1 remains in its high level state, the timing-difference calculating block 176 controls the second counter 174b so that the counted pulse number given by the second counter 174b will continuously increment from "0" as shown in the portion (J) of FIG. 6. Specifically, at the moment $t_{11}$ of occurrence of the rising edge in the timing-difference pulse signal H-1, the second counter 174b is controlled by the timing-difference calculating block 176 to start counting pulses of the clock pulse signal. Thereafter, the second counter 174b is controlled by the timing-difference calculating block 176 to continue counting pulses of the clock pulse signal until the moment $t_{12}$ of occurrence of the falling edge in the timing-difference pulse signal H-1. Furthermore, the second counter 174b is controlled by the timing-difference calculating block 176 to sample and hold the counted pulse number occurring at the moment $t_{12}$. The sampled and held number is used as an indication of the time difference AR1. In the portion (J) of FIG. 6, the time difference AR1 corresponds to a counted pulse number of 10.

The timing-difference calculating block 176 extends the positive pulse of the timing-difference pulse signal H-1 in time domain to generate an extended pulse signal I-1 having a waveform shown in the portion (I-1) of FIG. 6. Regarding the clap detection flags Fp1 and Fp2 caused by the same clap, the positive pulse in the extended pulse signal I-1 indicates that the clap detection flag Fp1 precedes the clap detection pulse Fp2, and that the source of the clap is closer to the left sound sensor 114a than the right sound sensor 114b.

Figure 7:
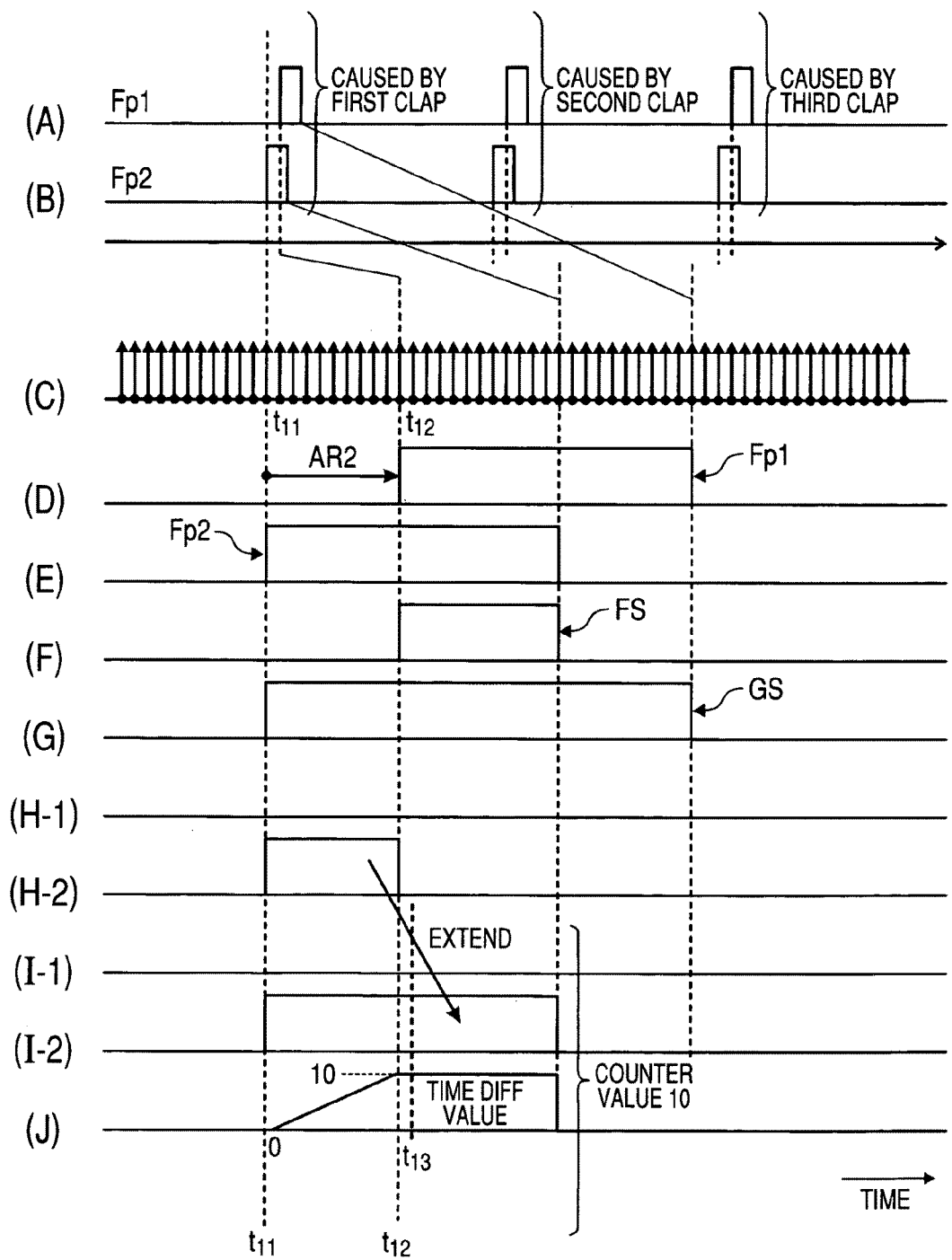
FIG. 7 is a time-domain diagram of the various signals related to the decision block in FIG. 5 which occur in the case where every clap reaches the right sound sensor before reaching the left sound sensor in the apparatus of FIG. 1.

FIG. 7 shows conditions of flags and signals which are similar to those in FIG. 6 except that regarding clap detection flags Fp1 and Fp2 caused by a same clap, the clap detection flag Fp2 precedes the clap detection pulse Fp1.

As shown in the portions (A) and (B) of FIG. 7, a pair of adjacent clap detection pulses Fp1 and Fp2 is caused by each of three successive claps generated by the user. Regarding clap detection pulses Fp1 and Fp2 caused by a same clap, the clap detection pulse Fp2 precedes the clap detection pulse Fp1. The first clap detection pulse Fp1 is shown in the portion (D) of FIG. 7 also. The first clap detection pulse Fp2 is shown in the portion (E) of FIG. 7 also. In the portions (D) and (E) of FIG. 7, the phase difference between the clap detection flags Fp1 and Fp2 means a to-be-measured time difference therebetween which is denoted by the arrow AR2.

The timing-difference calculating block 176 generates a timing-difference pulse signal H-2 in response to the clap detection flags Fp1 and Fp2. As shown in the portions (D), (E), and (H-2) of FIG. 7, the timing-difference pulse signal H-2 assumes a high level state when the clap detection flags Fp1 and Fp2 are in its low level state and its high level state respectively. Otherwise, the timing-difference pulse signal H-2 assumes a low level state. Regarding the clap detection flags Fp1 and Fp2 caused by the same clap, the timing-difference pulse signal H-2 in its high level state indicates that the clap detection flag Fp2 precedes the clap detection pulse Fp1, and that the source of the clap is closer to the right sound sensor 114b than the left sound sensor 114a. The duration of the positive pulse in the timing-difference pulse signal H-2 indicates the to-be-measured time difference AR2.

During the time interval for which the timing-difference pulse signal H-2 remains in its high level state, the timing-difference calculating block 176 controls the second counter 174b so that the counted pulse number given by the second counter 174b will continuously increment from "0" as shown in the portion (J) of FIG. 7. Furthermore, the timing-difference calculating block 176 controls the second counter 174b to sample and hold the counted pulse number occurring at the moment $t_{12}$ of occurrence of the falling edge in the timing-difference pulse signal H-2. The sampled and held number is used as an indication of the time difference AR2. In the portion (J) of FIG. 7, the time difference AR2 corresponds to a counted pulse number of 10.

The timing-difference calculating block 176 extends the positive pulse of the timing-difference pulse signal H-2 in time domain to generate an extended pulse signal I-2 having a waveform shown in the portion (I-2) of FIG. 7. Regarding the clap detection flags Fp1 and Fp2 caused by the same clap, the positive pulse in the extended pulse signal I-2 indicates that the clap detection flag Fp2 precedes the clap detection pulse Fp1, and that the source of the clap is closer to the right sound sensor 114b than the left sound sensor 114a.

Figure 9:
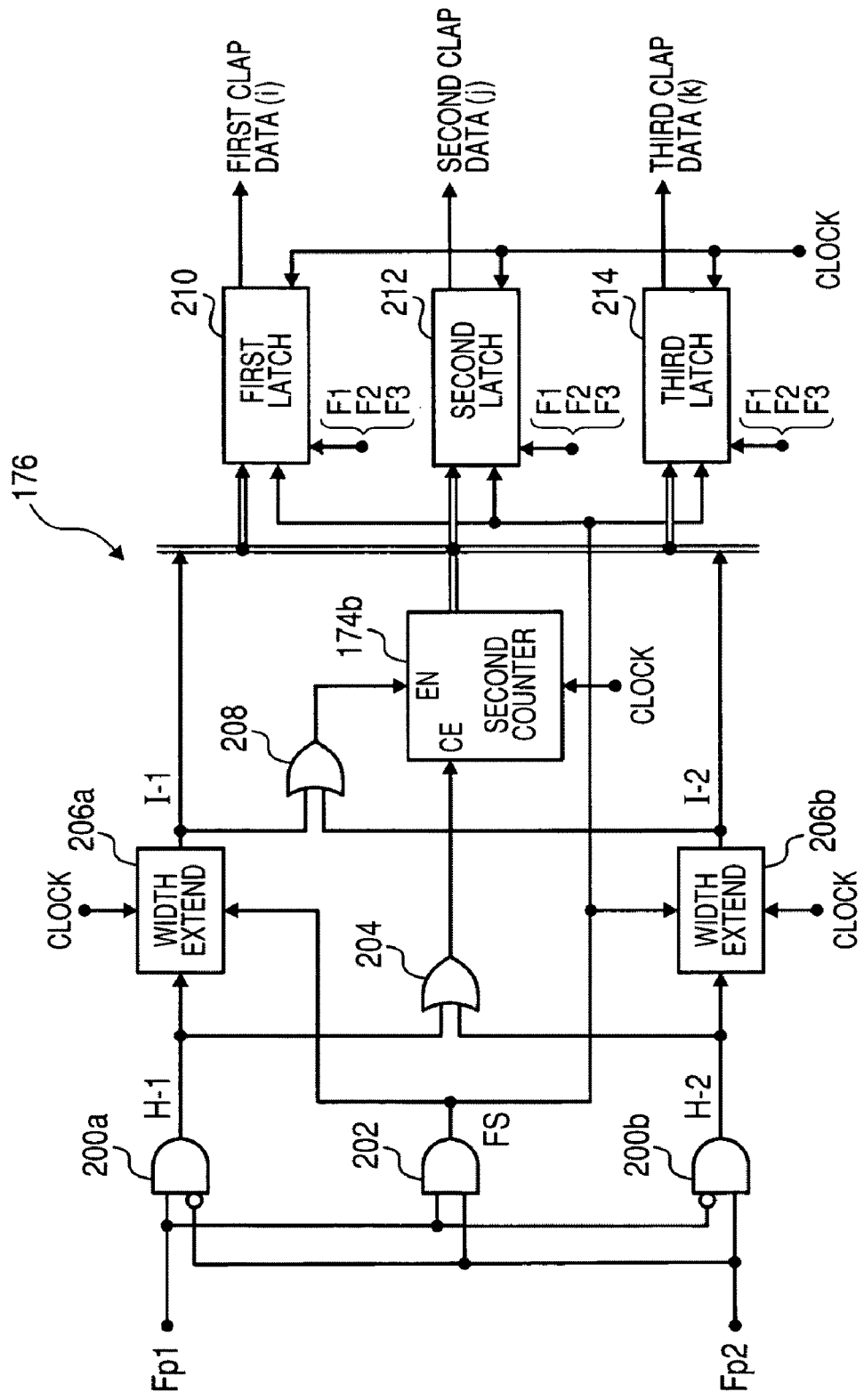
FIG. 9 is a block diagram of a timing-difference calculating block in FIG. 5.

As shown in FIG. 9, the timing-difference calculating block 176 includes AND circuits 200a, 200b, 202, an OR circuit 204, a first width extending block 206a, a second width extending block 206b, an OR circuit 208, and latch circuits 210, 212, and 214.

The AND circuit 200a implements AND operation between the clap detection flag Fp1 and the inversion of the clap detection pulse Fp2 to generate the timing-difference pulse signal H-1. The AND circuit 200b implements AND operation between the clap detection flag Fp2 and the inversion of the clap detection pulse Fp1 to generate the timing-difference pulse signal H-2. The timing difference pulse signals H-1 and H-2 travel from the AND circuits 200a and 200b to a chip enable (CE) terminal of the second counter 174b through the OR circuit 204. The AND circuit 202 implements AND operation between the clap detection pulses Fp1 and Fp2 to generate the pulse combination signal FS. The pulse combination signal FS travels from the AND circuit 202 to the first width extending block 206a, the second width extending block 206b, and the latch circuits 210, 212, and 214.

The first width extending block 206a responds to the clock pulse signal. The first width extending block 206a extends the width of every positive pulse in the timing-difference pulse signal H-1 by a time length for which the pulse combination signal FS remains in its high level state. Thereby, the first width extending block 206a generates the extended pulse signal I-1. The second width extending block 206b responds to the clock pulse signal. The second width extending block 206b extends the width of every positive pulse in the timing-difference pulse signal H-2 by a time length for which the pulse combination signal FS remains in its high level state. Thereby, the second width extending block 206a generates the extended pulse signal I-2. The extended pulse signals I-1 and I-2 travel from the first and second width extending blocks 206a and 206b to an enable (EN) terminal of the second counter 174b through the OR circuit 208. In addition, the extended pulse signals I-1 and I-2 travel from the first and second width extending blocks 206a and 206b to the latch circuits 210, 212, and 214.

Every positive pulse in the extended pulse signal I-1 indicates that regarding clap detection pulses Fp1 and Fp2 caused by a same clap, the clap detection pulse Fp1 precedes the clap detection pulse Fp2. Every positive pulse in the extended pulse signal I-2 indicates that regarding clap detection pulses Fp1 and Fp2 caused by a same clap, the clap detection pulse Fp2 precedes the clap detection pulse Fp1.

The second counter 174b operates to count pulses in the clock pulse signal. While one of the timing-difference pulse signals H-1 and H-2 applied to the CE terminal of the second counter 174b remains in its high level state, the second counter 174b continues to count pulses in the clock pulse signal. At the ending point of every positive pulse in the timing-difference pulse signals H-1 and H-2, the current counted pulse number given by the second counter 174b is sampled and held as an indication of the time difference AR1 or AR2. Thereafter, the sampled number indicating the time difference AR1 and AR2 continues to be held while one of the extended pulse signals I-1 and I-2 applied to the EN terminal of the second counter 174b remains in its high level state. At the ending point of every positive pulse in the extended pulse signals I-1 and I-2, the second counter 174b is reset so that the held number returns to "0" (see the portions (J) of FIGS. 6 and 7). A signal of the counted pulse number indicating the time difference AR1 or AR2 travels from the second counter 174b to the latch circuits 210, 212, and 214.

The latch circuits 210, 212, and 214 respond to the clock pulse signal. The latch circuits 210, 212, and 214 receive the first-time, second-time, and third-time detection flags F1, F2, and F3 from the sound-signal deciding block 172. As shown in FIG. 8, the first-time flag F1 is in its high level state and the second-time and third-time flags F2 and F3 are in their low level states in the case where the currently detected clap is the first one of successive claps. The latch circuit 210 is enabled or activated only when the first-time flag F1 is in its high level state and the second-time and third-time flags F2 and F3 are in their low level states. Thus, the latch circuit 210 is used only for the first one of successive claps. As shown in FIG. 8, the first-time and second-time flags F1 and F2 are in their high level states and the third-time flag F3 is in its low level state in the case where the currently detected clap is the second one of successive claps. The latch circuit 212 is enabled or activated only when the first-time and second-time flags F1 and F2 are in their high level states and the third-time flag F3 is in its low level state. Thus, the latch circuit 212 is used only for the second one of successive claps. As shown in FIG. 8, all the first-time, second-time, and third time flags F1, F2, and F3 are in their high level states in the case where the currently detected clap is the third one of successive claps. The latch circuit 214 is enabled or activated only when all the first-time, second-time, and third time flags F1, F2, and F3 are in their high level states. Thus, the latch circuit 212 is used only for the third one of successive claps.

While being enabled, the latch circuit 210 latches the extended pulse signals I-1 and I-2 and the counted pulse number signal indicative of the time difference AR1 or AR2 at a specified timing $t_{13}$ (see FIGS. 6 and 7) in a time interval for which the pulse combination signal FS remains in its high level state. The signals latched by the latch circuit 210 relate to the first one of successive claps. The latch circuit 210 feeds the latched signals to the sound-source detecting block 178 as first-time clap data (i). While being enabled, the latch circuit 212 latches the extended pulse signals I-1 and I-2 and the counted pulse number signal indicative of the time difference AR1 or AR2 at a specified timing $t_{13}$ in a time interval for which the pulse combination signal FS remains in its high level state. The signals latched by the latch circuit 212 relate to the second one of successive claps. The latch circuit 212 feeds the latched signals to the sound-source detecting block 178 as second-time clap data (j). While being enabled, the latch circuit 214 latches the extended pulse signals I-1 and I-2 and the counted pulse number signal indicative of the time difference AR1 or AR2 at a specified timing $t_{13}$ in a time interval for which the pulse combination signal FS remains in its high level state. The signals latched by the latch circuit 214 relate to the third one of successive claps. The latch circuit 214 feeds the latched signals to the sound-source detecting block 178 as third-time clap data (k).

It should be noted that the latch circuits 210, 212, and 214 may use the timing-difference pulse signals H-1 and H-2 instead of the extended pulse signals I-1 and I-2.

The sound-source detecting block 178 generates angle data θj from each of the first-time, second-time, and third-time clap data (i), (j), and (k) for three successive claps. The sound-source detecting block 178 generates angle data θj from the first-time clap data (i) for an isolated clap. Firstly, the sound-source detecting block 178 computes the difference $t_{dd}$ between the moments of arrival of a clap at the sound sensors 114a and 114b according to the following equation.

$$t_{dd} = n \cdot t_c \quad (4)$$

where "n" denotes the counted pulse number represented by the first-time clap data (i), the second-time clap data (j), or the third-time clap data (k), and "$t_c$" denotes the period of the clock pulse signal. Secondly, the sound-source detecting block 178 computes the angle (angular position) θ of the source of the clap according to the following equation.

$$\theta = \arcsin(n \cdot t_c \cdot c / md) \quad (5)$$

where "c" denotes the sound speed, and "md" denotes the distance between the sound sensors 114a and 114b. When the frequency of the clock pulse signal is 32 kHz, the minimum resolvable unit of the computed sound-source angle θ is about 0.6 degree so that the accuracy of the computed sound-source angle θ is sufficient. The computed sound-source angle θ is always expressed by an absolute value. Thirdly, the sound-source detecting block 178 converts the computed sound-source angle θ into a detected sound-source angle θd in response to the extended pulse signals I-1 and I-2 in the first-time, second-time, and third-time clap data (i), (j), and (k). The computed sound-source angle θ is defined as an absolute angle measured from a perpendicular line with respect to the front face of the television receiver 100 (see FIG. 2). The perpendicular line extends from the center D of the front face of the television receiver 100. The computed sound-source angle θ being equal to 0 degree corresponds to the perpendicular line. When the extended pulse signal I-1 is in its high level state and the extended pulse signal I-2 is in its low level state, the sound-source detecting block 178 labels the computed sound-source angle θ as the detected sound-source angle θd. Thus, in this case, θd=θ. When the extended pulse signal I-1 is in its low level state and the extended pulse signal I-2 is in its high level state, the sound-source detecting block 178 adds the negative sign to the computed sound-source angle θ and sets the detected sound-source angle θd to the addition result angle. Thus, in this case, θd=−θ. When the extended pulse signals I-1 and I-2 are in their low level states, the sound-source detecting block 178 sets the detected sound-source angle θd to 0 degree. Thus, in this case, θd=0. When the extended pulse signals I-1 and I-2 are in their high level states, the sound-source detecting block 178 regards the computed sound-source angle θ as being ineffective. In this case, the sound-source detecting block 178 does not provide the detected sound-source angle θd. Fourthly, the sound-source detecting block 178 generates angle data θj representing the detected sound-source angle θd, and outputs the angle data θj to the system controller 102.

As shown in FIG. 10, the angle data θj generated by the sound-source detecting block 178 depends on the logic states of the extended pulse signals I-1 and I-2. When the extended pulse signals I-1 and I-2 are in their logic states of "0" (low-level states), the angle data θj represents an angle of 0 degree. In this case, the measured direction of the sound source corresponds to a center as seen from the center D of the front face of the television receiver 100. When the extended pulse signal I-1 is in a logic state of "0" and the extended pulse signal I-2 is in a logic state of "1" (a high level state), the angle data θj represents a negative angle measured counterclockwise (left-ward) from the perpendicular line with respect to the front face of the television receiver 100 which extends from the television receiver center D. In this case, the measured direction of the sound source corresponds to "left" as seen from the television receiver center D, and the expression (−θj, left) is used. When the extended pulse signal I-1 is in a logic state of "1" and the extended pulse signal I-2 is in a logic state of "0", the angle data θj represents a positive angle measured clockwise (rightward) from the perpendicular line with respect to the front face of the television receiver 100 which extends from the television receiver center D. In this case, the measured direction of the sound source corresponds to "right" as seen from the television receiver center D, and the expression (θj, right) is used. When the extended pulse signals I-1 and I-2 are in their logic states of "1", the angle data θj is not generated. In this case, the measurement of the sound-source direction is ineffective.

One detected sound-source angle θd (or one computed sound-source angle θ) is obtained for every clap generated by the user. As previously mentioned, in the case where the on/off mode is chosen, the power supply of the monitor 110 is changed to its on state in response to three successive claps generated by the user. In the case where the on/off mode is chosen and the power supply of the monitor 110 is in its on state, the on/off mode is replaced by the selection up/down mode in response to three successive claps generated by the user.

The system controller 102 responds to the decision result flag Fj generated by the sound-signal deciding block 172 which indicates that three successive claps are detected. Specifically, the system controller 102 computes a reference angle (a reference sound-source angle) from the angle data θj related to the three successive claps. The reference angle is equal to, for example, the mean value of detected sound-source angles θd related to the three successive claps respectively. The reference angle may be equal to the detected sound-source angle θd related to the third one of the three successive claps.

The sound-source detecting block 178 may respond to the decision result flag Fj. In this case, the sound-source detecting block 178 calculates the mean value of detected sound-source angles θd related to the three successive claps respectively. Then, the sound-source detecting block 178 generates and outputs angle data θj representing the calculated mean value (the calculated mean sound-source angle). The system controller 102 labels the mean sound-source angle represented by the angle data θj as the reference angle.

Figure 11:
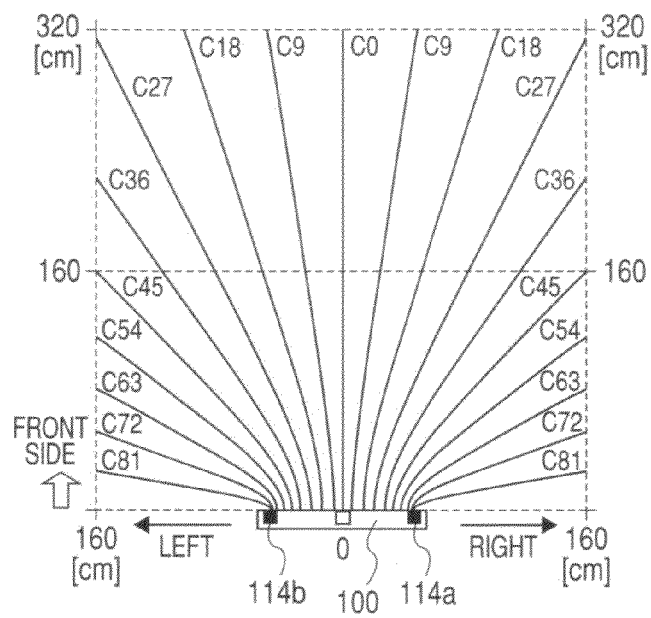
FIG. 11 is a diagram of the apparatus in FIG. 1 as seen from above, the sound sensors in the apparatus, and contour lines indicating angles of a sound source which are obtained by a computer simulation.

With reference to FIG. 11, the television receiver 100 is shown as seen from above. The longitudinal direction of the television receiver 100 is taken as an X axis, and a perpendicular line with respect to the front face of the television receiver 100 is taken as a Y axis. There are contour lines C0-C81 of detected sound-source angles θd spaced at 9-degree intervals and extending between 0 degree and 81 degrees in absolute value. The sound source is on the line C0 when the detected sound-source angle θd is equal to 0 degree. The sound source is on the right line C9 when the detected sound-source angle θd is equal to 9 degrees. The sound source is on the left line C9 when the detected sound-source angle θd is equal to −9 degrees. The sound source is on the right line C45 when the detected sound-source angle θd is equal to 45 degrees. The sound source is on the left line C45 when the detected sound-source angle θd is equal to −45 degrees. The XY coordinate point (160 cm, 160 cm) is substantially on the right line C45. The XY coordinate point (−160 cm, 160 cm) is substantially on the left line C45. These facts reveal that the detected sound-source angles θd are approximately equal to the theoretical values.

The distance between the sound sensors 114*a* and 114*b* is equal to, for example, about 100 cm. The sound sensor 114*a* is located in the left edge part of the front face of the television receiver 100. The sound sensor 114*b* is located in the right edge part of the front face of the television receiver 100. In the case where the sound source exists in an area very near the front face of the television receiver 100, the detected sound-source angle θd tends to deviate from the theoretical value. In spite of this fact, the detected sound-source angle θd is acceptable and reliable from the viewpoint of practical use.

Figure 12:
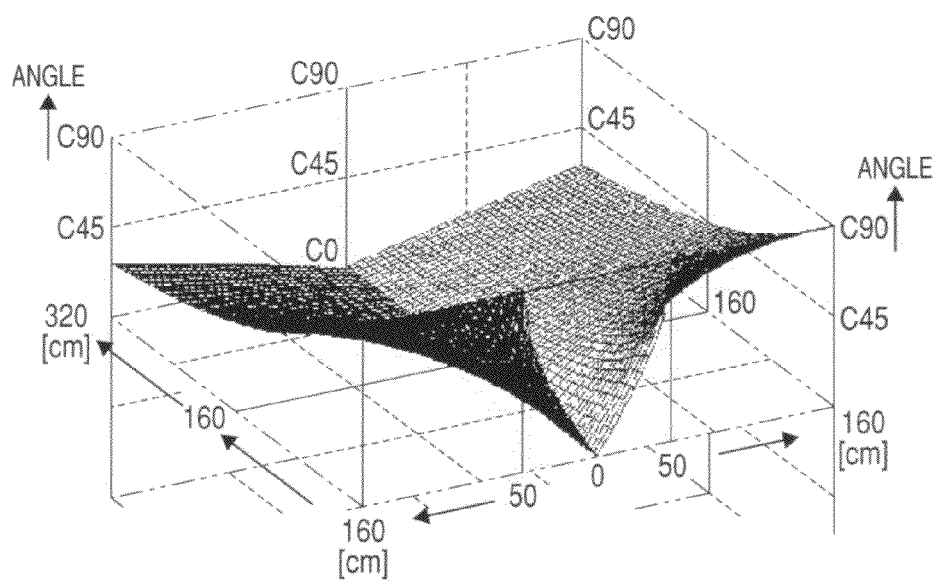
FIG. 12 is a bird's-eye view of the contour lines in FIG. 11.

With reference to FIG. 12, in the case where the sound source exists in an area very near the front face of the television receiver 100, a small angle-direction movement of the sound source causes a great change in the detected sound-source angle θd. When the sound source exists in other areas, a small angle-direction movement of the sound source causes a small change in the detected sound-source angle θd. Therefore, the detected sound-source angle θd is acceptable and reliable from the viewpoint of practical use.

With reference back to FIG. 3, the system controller 102 implements a relative-value deriving block 180, an operation controlling block 182, a content-presentation controlling block 184, a relative-value-presentation controlling block 186, an audio output controlling block 188, and a sound-image locating block 190.

The relative-value deriving block 180 derives a reference angle (a reference sound-source angle) from the detected sound-source angle represented by the angle data θj which is outputted from the sound-source detecting block 178 (see FIG. 5) during a prescribed time interval. The relative-value deriving block 180 stores a signal representative of the reference angle into the memory unit 104. The aforesaid prescribed time interval is defined as a term for which the power supply of the television receiver 100 is in its on state and a GUI (Graphical User Interface) menu picture is not indicated by the monitor 110. The prescribed time interval terminates upon the indication of the GUI menu picture by the monitor 110. The prescribed time interval also terminates when three successive claps have been detected by the sound processor 150. Specifically, the relative-value deriving block 180 calculates the mean value of detected sound-source angles θd related to three successive claps and represented by the angle data θj during the prescribed time interval. The relative-value deriving block 180 labels the calculated mean value as the reference angle.

Under the condition where a signal representative of a reference angle (a reference sound-source angle) is already stored in the memory unit 104, the relative-value deriving block 180 processes angle data θj outputted from the sound-source detecting block 178 which corresponds to a later clap generated by the user. Specifically, the relative-value deriving block 180 retrieves the signal of the reference angle from the memory unit 104. Then, the relative-value deriving block 180 calculates the angle of the sound source of the later clap relative to the reference angle. In other words, the relative-value deriving block 180 calculates the relative angle between the angular position of the sound source of the former clap or claps (causing the reference angle) and the angular position of the sound source of the later clap.

The operation controlling block 182 controls a condition or conditions of the television receiver 100 in response to the decision result flag Fj, Fk, or Fm outputted from the sound-signal deciding block 172, that is, in response to a clap or claps detected by the sound processor 150. In addition, the operation controlling block 182 checks the angle data θj outputted from the sound-source detecting block 178 while referring to a signal representative of an effective angular range which is stored in the memory unit 104 or a memory within the system controller 102. Specifically, the operation controlling block 182 decides whether or not the current sound-source angle represented by the angle data θj is within the effective angular range. When it is decided that the current sound-source angle is within the effective angular range, the operation controlling block 182 implements the control of the condition or conditions of the television receiver 100 in response to the currently detected clap or claps. Otherwise, the operation controlling block 182 does not implement the control. Therefore, the television receiver 100 is prevented from being operated or controlled in response to a sound generated at a position outside the effective angular range. For example, the effective angular range is a prescribed angular range as seen in the front direction from the center D of the front face of the television receiver 100 and centered at the central perpendicular line with respect to the front face of the television receiver 100. The effective angular range may be a prescribed larger angular range except a prescribed smaller angular range extending within the larger one. The effective angular range may be varied as the number of the types of the contents of (the number of choices about) the control by the operation controlling block 182 changes. In this case, the effective angular range is determined on a calculation basis. The effective angular range may depend on whether the on/off mode or the selection up/down mode is chosen.

Preferably, an initial effective angular range is preset for the on/off mode. Preferably, when the on/off mode is replaced by the selection up/down mode, the initial effective angular range is narrowed and updated to an effective angular range for the selection up/down mode. The narrowed effective angular range is centered at the latest reference sound-source angle.

Figure 13:
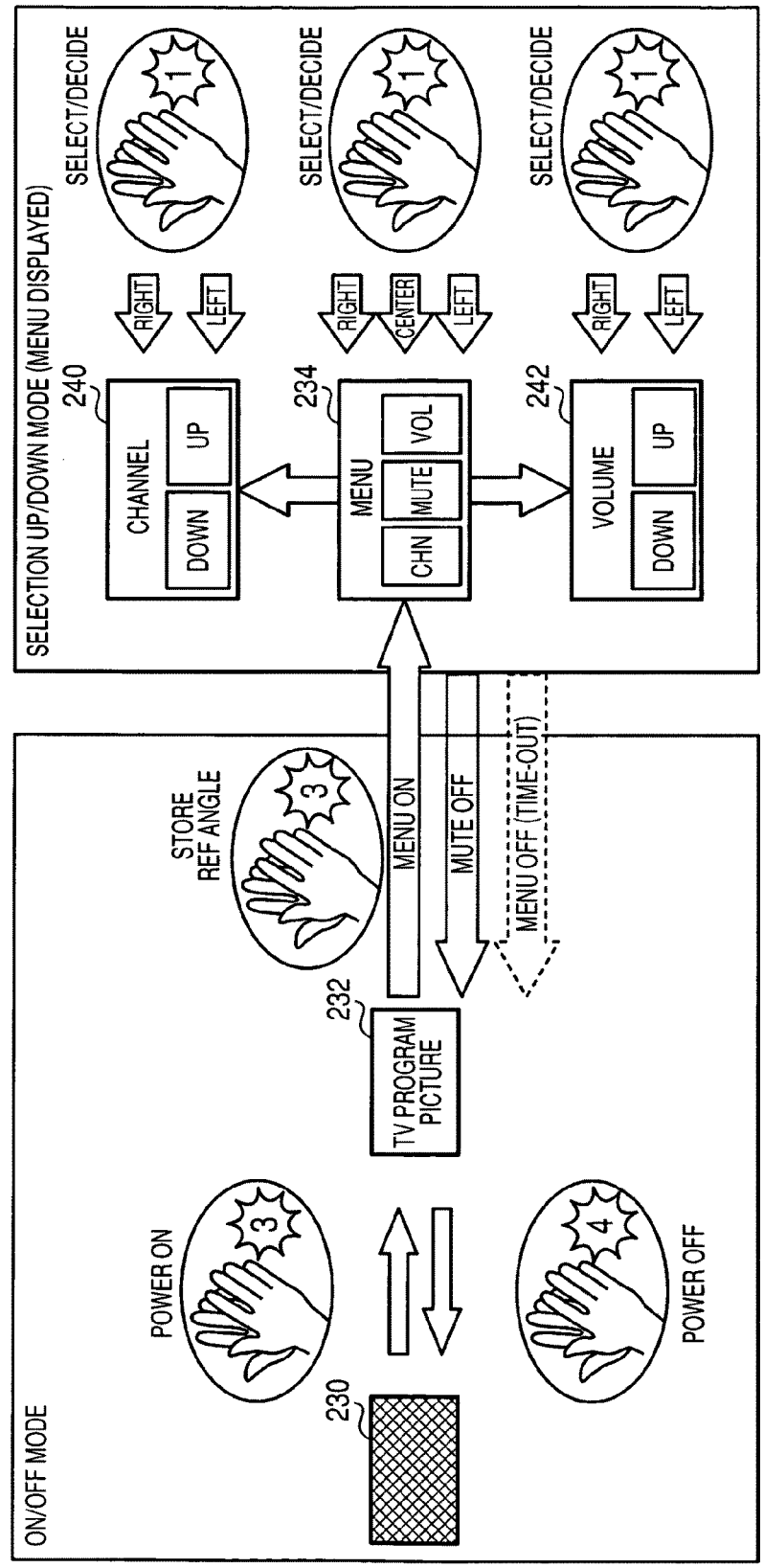
FIG. 13 is a diagram of the relation among operation modes of the apparatus in FIG. 1 and pictures displayed by a monitor in the apparatus.

With reference to FIG. 13, there are the on/off mode and the selection up/down mode from which one can be chosen. In the case where the on/off mode is chosen, the operation controlling block 182 changes the power supply of the monitor 110 between its on state and its off state in response to the number of successive claps detected by the sound processor 150. Specifically, in the case where the on/off mode is chosen and the power supply of the monitor 110 is in its off state, the operation controlling block 182 changes the power supply of the monitor 110 to its on state in response to a decision result flag Fj indicating that three successive claps are detected by the sound processor 150. In the case where the on/off mode is chosen and the power supply of the monitor 110 is in its on state, the operation controlling block 182 changes the power supply of the monitor 110 to its off state in response to a decision result flag Fk indicating that four successive claps are detected by the sound processor 150. In the case where the on/off mode is chosen and the power supply of the monitor 110 is in its on state, the operation controlling block 182 replaces the chosen mode with the selection up/down mode and hence implements the indication of a menu picture on the monitor 110 in response to a decision result flag Fj indicating that three successive claps are detected by the sound processor 150. In the case where the selection up/down mode is chosen, the operation controlling block 182 implements a control step in response to a decision result flag Fm indicating that a clap is detected by the sound processor 150.

The system controller 102 outputs the mode signal to the sound-signal deciding block 172. The mode signal indicates the mode chosen from the on/off mode and the selection up/down mode. In other words, the mode signal indicates which of the on/off mode and the selection up/down mode is chosen. The on/off mode is chosen during all terms except a term for which the selection up/down mode is chosen. Preferably, the signal representative of the reference angle is stored in the memory unit 104 immediately before or when the selection up/down mode is chosen. Specifically, when three successive claps generated at a position within the effective angular range are detected and a decision result flag Fj is outputted from the sound processor 150 under the condition where the power supply of the monitor 110 is in its on state and a menu picture is not indicated by the monitor 110, the system controller 102 changes the chosen mode from the on/off mode to the selection up/down mode in response to the decision result flag Fj. The chosen mode change responsive to three successive claps suppresses the occurrence of wrong detection of a mode change request by the user. Upon the choice of the selection up/down mode, the system controller 102 allows a menu picture to be indicated by the monitor 110. In the case where the on/off mode is chosen, the system controller 102 sets the effective angular range to, for example, a prescribed angular range as seen in the front direction from the center D of the front face of the television receiver 100 and centered at the central perpendicular line with respect to the front face of the television receiver 100.

In FIG. 13, the screen of the monitor 110 is dark as denoted by the reference numeral 230 when the power supply of the monitor 110 is in its off state. When three successive claps generated at a position within the effective angular range for the on/off mode at substantially equal intervals are detected by the sound processor 150 under the foresaid condition, a decision result flag Fj is outputted from the sound processor 150. The system controller 102 changes the power supply of the monitor 110 to its on state and controls the video mixer 124 in response to the decision result flag Fj so that a television program picture (a broadcast program picture) 232 is indicated by the monitor 110.

The user generates three successive claps at substantially equal intervals when requesting the sound volume or the currently-selected television channel to be changed. When three successive claps generated at a position within the effective angular range for the on/off mode at substantially equal intervals are detected by the sound processor 150 under the condition where the monitor 110 is in its on state, a decision result flag Fj is outputted from the sound processor 150. The content-presentation controlling block 184 controls the graphics signal generator 122 in response to the decision result flag Fj to generate a video signal (a graphics signal) representative of a menu picture 234 indicating operation items controllable by the operation controlling block 182. The indicated operation items are choices in the menu picture 234, and denote respective controllable conditions of the television receiver 100. Then, the content-presentation controlling block 184 controls the graphics signal generator 122 and the video mixer 124 to feed the generated video signal to the monitor 110 and thereby enable the monitor 110 to display the menu picture 234 represented by the video signal. The menu picture 234 has sub pictures relating to the respective operation items (the respective choices or the respective controllable conditions). For example, the operation items correspond to sound-volume control, mute control, and channel control, respectively. The sub pictures are arranged along a horizontal direction. The sub pictures corresponding to the sound-volume control, the mute control, and the channel control extend in a right area, a central area, and a left area in the menu picture 234, respectively. The content-presentation controlling block 184 measures the lapse of time from the moment of detection of the last clap. The content-presentation controlling block 184 decides whether or not the measured lapse of time reaches a prescribed term. When it is decided that the measured lapse of time reaches the prescribed term, the content-presentation controlling block 184 controls the video mixer 124 to halt the display of the menu picture 234 on the monitor 110. Thus, the halt of the display of the menu picture 234 is implemented on a time-out basis. In that case, the content-presentation controlling block 184 may control the video mixer 124 to replace the menu picture 234 on the monitor 110 by a television program picture 232.

The sound-source detecting block 178 in the sound processor 150 detects the angle or angular position of the sound source (the user) of the three successive claps which cause the indication of the menu picture 234 by the monitor 110. The relative-value deriving block 180 in the system controller 102 derives a reference angle (a reference sound-source angle) from the sound-source angle detected by the sound-source detecting block 178. The relative-value deriving block 180 stores a signal representative of the reference angle into the memory unit 104.

As the menu picture 234 is indicated by the monitor 110, the operation controlling block 182 changes the chosen mode from the on/off mode to the selection up/down mode and generates a mode signal indicating that the selection up/down mode is chosen. The operation controlling block 182 outputs the generated mode signal to the sound-signal deciding block 172 in the sound processor 150. In this way, the replacement of the on/off mode with the selection up/down mode is implemented.

When the selection up/down mode is chosen, the system controller 102 uses an effective angular range equal to or different from that used for the on/off mode. Upon the change of the chosen mode from the on/off mode to the selection up/down mode, the system controller 102 may restrict or narrow the effective angular range for the on/off mode to generate the effective angular range for the selection up/down mode. The system controller 102 may center the effective angular range for the selection up/down mode at the reference angle.

The control of the graphics signal generator 122 by the content-presentation controlling block 184 is designed so that the positions, at which the operation items controllable by the operation controlling block 182 are indicated within the menu picture 234 on a GUI basis, will be related with the angle of a sound source of a clap to be generated by the user for selecting one from the operation items. In the case where the indications of the operation items of the sound-volume control, the mute control, and the channel control extend in a right area, a central area, and a left area in the menu picture 234 respectively, the relative-value deriving block 180 informs the operation controlling block 182 of a right portion, a central portion, and a left portion of the effective angular range for the selection up/down mode as seen from the user. The operation controlling block 182 responds to every decision result flag Fm outputted from the sound sensor 150, and thereby implements the following operation steps. The operation controlling block 182 decides which of the right portion, the central portion, and the left portion of the effective angular range contains the relative angle of a sound source of a currently detected clap which is calculated by the relative-value deriving block 180. When it is decided that the right portion of the effective angular range contains the relative angle of the sound source, the operation controlling block 182 selects the operation item of the sound-volume control. When it is decided that the central portion of the effective angular range contains the relative angle of the sound source, the operation controlling block 182 selects the operation item of the mute control. When it is decided that the left portion of the effective angular range contains the relative angle of the sound source, the operation controlling block 182 selects the operation item of the channel control. These operation steps allow the user to easily and correctly select desired one from the operation items.

Upon the change of the chosen mode from the on/off mode to the selection up/down mode, the audio output controlling block 188 controls the sound signal generator 126 to generate a right-channel sound signal representing a vocal message "volume is right", a monophonic sound signal representing a vocal message "mute is center", and a left-channel sound signal representing a vocal message "channel is left". Then, the audio output controlling block 188 controls the sound signal generator 126 and the audio mixer 128 to feed the generated right-channel sound signal to the right loudspeaker 112b and feed the generated left-channel sound signal to the left loudspeaker 112a, and feed the generated monophonic sound signal to both the loudspeakers 112a and 112b through the main amplifier 116. As a result, the right loudspeaker 112b emits the vocal message "volume is right". The left loudspeaker 112a emits the vocal message "channel is left". The loudspeakers 112a and 112b emit the vocal message "mute is center". The control of the sound signal generator 126 by the audio output controlling block 188 is designed so that the timings of emission of the vocal messages from the loudspeakers 112a and 112b will be different. These operation steps allow the user to easily and correctly select desired one from the operation items.

As understood from the above description, the user is visually and auditorily informed of the angular position of a clap to be generated for the selection of one from the operation items controllable by the controllable by the operation controlling block 182. It should be noted that the user may be only visually or auditorily informed.

Figure 14:
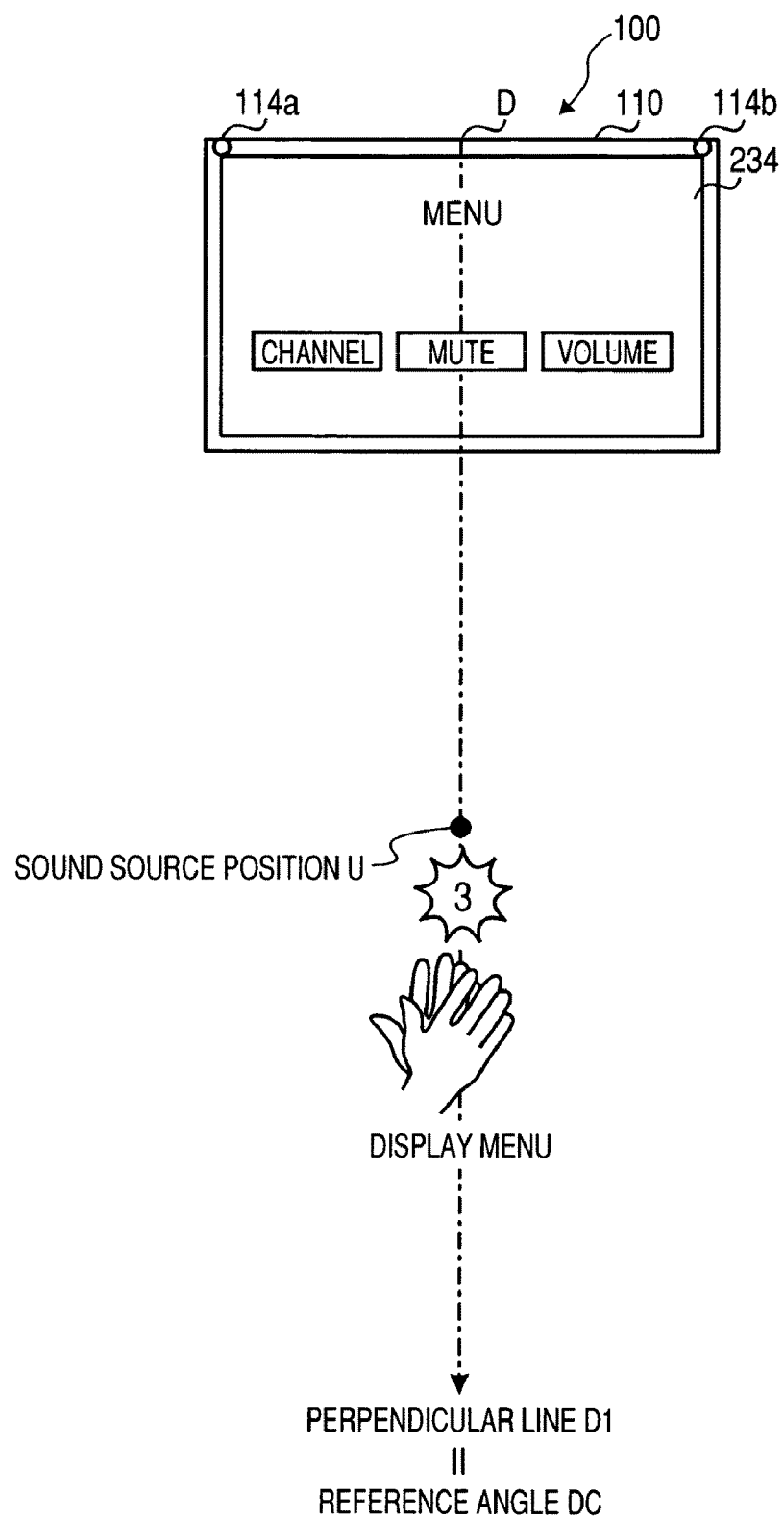
FIG. 14 is a diagram of a front face of the apparatus in FIG. 1, a menu picture displayed by the monitor in the apparatus, and a clap or claps generated by a user.
Figure 15:
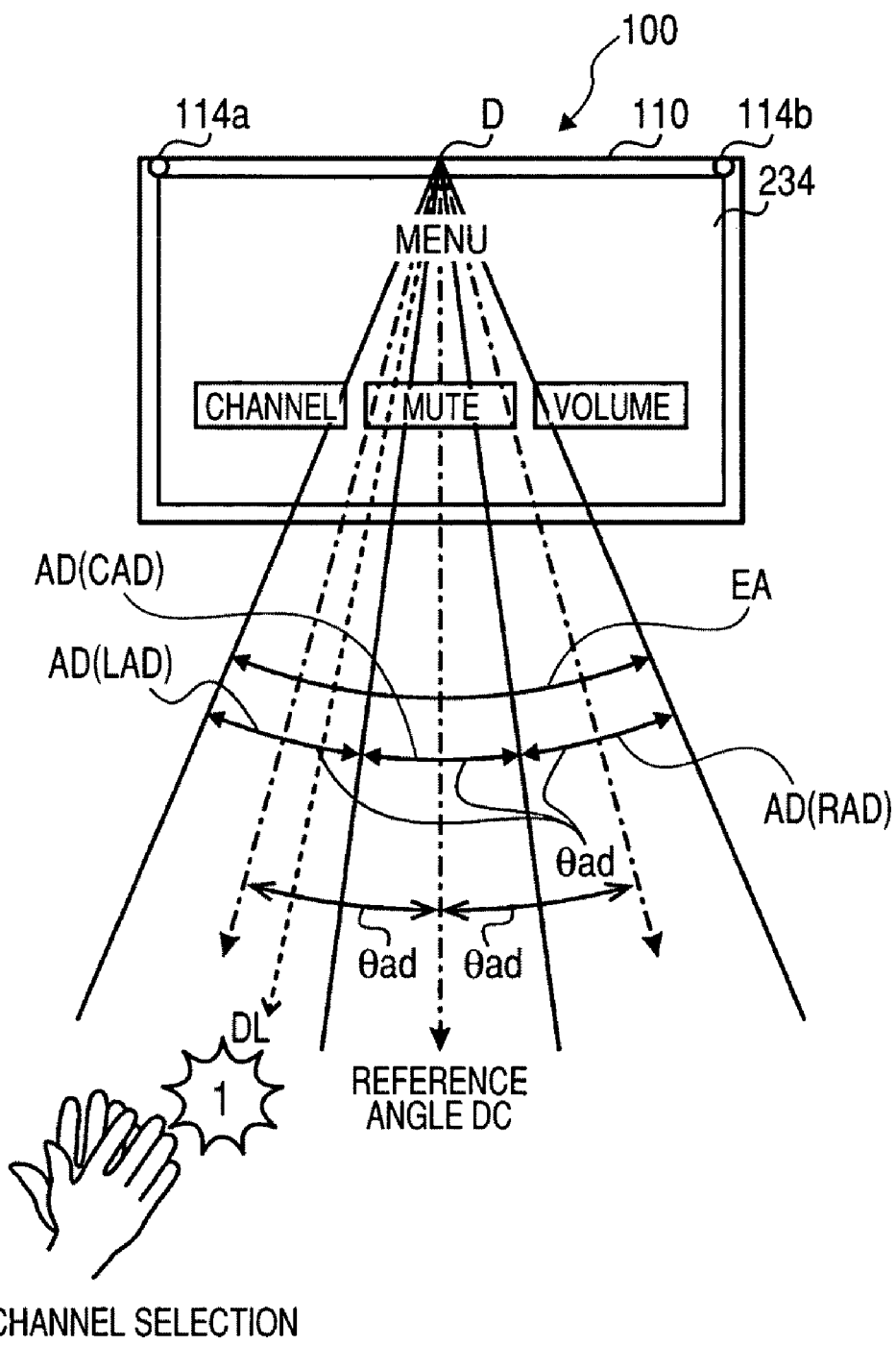
FIG. 15 is a diagram of the front face of the apparatus in FIG. 1, the menu picture displayed by the monitor in the apparatus, a clap generated by the user, an effective angular range, and selection zones.

With reference to FIGS. 14 and 15, there is a menu picture 234 which is indicated on the monitor 110 when the on/off mode is replaced by the selection up/down mode in response to three successive claps received by the sound sensors 114a and 114b at substantially equal intervals. There is a reference angle (a reference sound-source angle) DC for the received three successive claps which is determined by the system controller 102 on the basis of the angle data $\theta j$ outputted from the sound-source detecting block 178 in the sound processor 150.

As shown in FIGS. 14 and 15, the sub pictures of the sound-volume control, the mute control, and the channel control (the operation items or the controllable conditions) extend in the right area, the central area, and the left area in the menu picture 234, respectively. As previously mentioned, the relative-value deriving block 180 in the system controller 102 stores the signal representative of the reference angle DC into the memory unit 104. In FIG. 14, the reference angle DC corresponds to the perpendicular line D1 with respect to the front face of the television receiver 100 which extends from the television center D, and is thus equal to 0 degree.

Under the condition where the relative-value deriving block 180 has stored the signal representative of the reference angle DC into the memory unit 104, when the user generates a clap to select one from the operation items (the sound-volume control, the mute control, and the channel control), the clap is received by the sound sensors 114a and 114b and is detected by the sound processor 150. The sound-signal deciding block 172 in the sound processor 150 generates a decision result flag Fm indicative of the detection of the clap, and outputs the decision result flag Fm to the system controller 150 to notify the detection of the clap thereto. The sound-source detecting block 178 in the sound processor 150 feeds the angle data $\theta j$ for the currently detected clap to the relative-value deriving block 180 in the system controller 102. The relative-value deriving block 180 retrieves the signal of the reference angle DC from the memory unit 104, and gets the angle of the sound source of the currently detected clap from the angle data $\theta j$. Then, the relative-value deriving block 180 calculates the angle of the sound source of the currently detected clap relative to the reference angle DC.

In the case where the selection up/down mode is chosen, the operation controlling block 182 in the system controller 102 retrieves the signal of the reference sound-source angle DC from the memory unit 104 and defines an effective angular range EA (see FIG. 15) centered at the reference sound-source angle DC and equal to or within that used for the on/off mode. The effective angular range EA for the selection up/down mode may be provided by the relative-value deriving block 180. The operation controlling block 182 gets the angle of the sound source of the currently detected clap from the angle data $\theta j$. Then, the operation controlling block 182 decides whether or not the angle of the sound source of the currently detected clap is within the effective angular range EA. When it is decided that the current sound-source angle is within the effective angular range EA, the operation controlling block 182 implements the control of the condition or conditions of the television receiver 100 in response to the currently detected clap. Otherwise, the operation controlling block 182 does not implement the control. Therefore, the television receiver 100 is prevented from being operated or controlled in response to a sound generated at a position outside the effective angular range EA.

Furthermore, the operation controlling block 182 is informed of the relative angle of the sound source of the currently detected clap which is calculated by the relative-value deriving block 180. The operation controlling block 182 decides which of a right portion RAD, a central portion CAD, and a left portion LAD of the effective angular range EA as seen from the user contains the relative angle of the sound source of the currently detected clap. The right portion RAD, the central portion CAD, and the left portion LAD of the effective angular range EA are notified by the relative-value deriving block 180. When it is decided that the right portion RAD of the effective angular range EA contains the relative angle of the sound source, the operation controlling block 182 selects the operation item of the sound-volume control. When it is decided that the central portion CAD of the effective angular range EA contains the relative angle of the sound source, the operation controlling block 182 selects the operation item of the mute control. When it is decided that the left portion LAD of the effective angular range contains the relative angle of the sound source, the operation controlling block 182 selects the operation item of the channel control.

According to a first zone-setting procedure, the relative-value deriving block 180 sets sequential selection zones (neighboring selection zones). Preferably, each of the sequential selection zones has a predetermined angular dimension. The number of the sequential selection zones is equal to that of operation items from which one can be selected by the user. The number of the operation items means that of the types of (the choices about) the control by the operation controlling block 182. The menu picture indicated on the monitor 110 has sub pictures which positionally correspond to the sequential selection zones respectively, and which represent the operation items respectively. The group of the sequential selection zones is centered at the reference sound-source angle DC. The relative-value deriving block 180 combines the sequential selection zones into an effective angular range EA for the selection up/down mode. In this case, the sequential selection zones accord with portions of the effective angular range EA, respectively. The operation controlling block 182 decides which of the portions of the effective angular range EA contains the relative angle of the sound source of the currently detected clap and thereby determines which of the operation items is selected by the user. In the case where the number of operation items (choices) is three, the relative-value deriving block 180 sets a right selection zone RAD, a central selection zone CAD, and a left selection zone LAD. Preferably, each of the right selection zone RAD, the central selection zone CAD, and the left selection zone LAD has a predetermined angular dimension. The central selection zone CAD is centered at the reference sound-source angle DC. The right selection zone RAD and the left selection zone LAD extend rightward and leftward of the central selection zone CAD, respectively. The relative-value deriving block 180 combines the right selection zone RAD, the central selection zone CAD, and the left selection zone LAD into an effective angular range EA for the selection up/down mode. In this case, the right selection zone RAD, the central selection zone CAD, and the left selection zone LAD accord with the right portion, the central portion, and the left portion of the effective angular range EA, respectively.

According to a second zone-setting procedure which can replace the first zone-setting procedure, the relative-value deriving block 180 defines an effective angular range EA for the selection up/down mode which is centered at the reference sound-source angle DC. The relative-value deriving block 180 divides the effective angular range EA into portions. Preferably, each of the portions has a predetermined angular dimension. The number of the portions is equal to that of operation items from which one can be selected by the user. The operation controlling block 182 decides which of the portions of the effective angular range EA contains the relative angle of the sound source of the currently detected clap and thereby determines which of the operation items is selected by the user. In the case where the number of operation items is three, the relative-value deriving block 180 divides the effective angular range EA into a right portion RAD, a central portion CAD, and a left portion LAD. The central portion CAD is centered at the reference sound-source angle DC. Preferably, each of the right portion RAD, the central portion CAD, and the left portion LAD has a predetermined angular dimension.

The details of the first zone-setting procedure are as follows. The memory unit 104 previously stores a signal representative of a predetermined basic angle θad. It is assumed that the three successive claps causing the reference angle are generated at a first position in front of the center of the breast of the user. The characters "sd" denote the distance between the right and left edges of a typical zone which is centered at the first position, and within which the hands of the user can be moved without difficulty. The characters "ddc" denote the distance between the user and the front face of the television receiver 100. The basic angle θad is given by the following equation.

$$\theta ad = \arctan(sd/ddc) \quad (6)$$

When the distance "sd" is equal to 20 cm and the distance "ddc" is equal to 2 m, the basic angle θad is equal to 5.7 degrees. The basic angle θad may be chosen depending on the size of the television receiver 100, the size of the monitor 110, and the conditions of use of the television receiver 100. The relative-value deriving block 180 retrieves the signal of the basic angle θad from the memory unit 104. The relative-value deriving block 180 sets "m" sequential selection zones (neighboring selection zones) AD, where "m" denotes a positive integer equal to the number of the types of the control by the operation controlling block 182 (that is, the number of operation items from which one can be selected by the user). Accordingly, the menu picture indicated on the monitor 110 has "m" sub pictures which positionally correspond to the "m" sequential selection zones AD respectively, and which represent "m" operation items respectively. Preferably, each of the "m" sequential selection zones AD has a predetermined angular dimension equal to the basic angle θad. The group of the "m" sequential selection zones is centered at the reference sound-source angle DC. The relative-value deriving block 180 combines the "m" sequential selection zones AD into an effective angular range EA for the selection up/down mode. In this case, the "m" sequential selection zones AD accord with "m" portions of the effective angular range EA, respectively. The operation controlling block 182 decides which of the portions of the effective angular range EA contains the relative angle of the sound source of the currently detected clap and thereby determines which of the operation items is selected by the user. When the positive integer "m" is three, the relative-value deriving block 180 sets a right selection zone RAD, a central selection zone CAD, and a left selection zone LAD as sequential selection zones (neighboring selection zones) AD. The central selection zone CAD is centered at the reference sound-source angle DC. The central selection zone CAD has a predetermined angular dimension equal to the basic angle θad. Preferably, each of the right selection zone RAD and the left selection zone LAD has the predetermined angular dimension also. The right selection zone RAD and the left selection zone LAD extend rightward and leftward of the central selection zone CAD, respectively. The relative-value deriving block 180 combines the right selection zone RAD, the central selection zone CAD, and the left selection zone LAD into an effective angular range EA for the selection up/down mode. In this case, the right selection zone RAD, the central selection zone CAD, and the left selection zone LAD accord with the right portion, the central portion, and the left portion of the effective angular range EA, respectively. When the positive integer "m" is two, the relative-value deriving block 180 sets a right selection zone RAD and a left selection zone LAD such that the boundary between them corresponds to the reference sound-source angle DC. Preferably, each of the right selection zone RAD and the left selection zone LAD has a predetermined angular dimension equal to the basic angle θad.

As shown in FIG. 15, in the case where the positive integer "m" is three and each of the right selection zone RAD, the central selection zone CAD, and the left selection zone LAD has the predetermined angular dimension equal to the basic angle θad, the centers of the right selection zone RAD and the left selection zone LAD are angularly spaced from the center of the central selection zone CAD by angular intervals equal to the basic angle θad. The effective angular range EA which consists of the right selection zone RAD, the central selection zone CAD, and the left selection zone LAD has an angular dimension equal to 3θad. When the basic angle θad is equal to 5.7 degrees, the angular dimension of the effective angular range EA is equal to 17.1 degrees. The central selection zone CAD and the effective angular range EA are centered at the reference sound-source angle DC. As previously mentioned, the control of the condition or conditions of the television receiver 100 is responsive to only a clap or claps generated at positions within the effective angular range EA.

When the positive integer "m" is odd, one of the "m" sequential selection zones AD which corresponds to the middle one of the sub pictures in the menu picture is centered at the reference sound-source angle DC. Preferably, the angular dimension of the rightmost and leftmost ones of the "m" sequential selection zones AD is chosen depending on a required sound sensing accuracy. When the positive integer "m" is even, the group of the "m" sequential selection zones AD is centered at the reference sound-source angle DC. In this case, it is preferable that the reference sound-source angle DC corresponds to the boundary between two adjacent selection zones AD relating to the two middle ones of the sub pictures in the menu picture.

The details of the second zone-setting procedure are as follows. The memory unit 104 previously stores a signal representative of a given angle. The given angle may be provided on a calculation basis. The relative-value deriving block 180 retrieves the signal of the given angle from the memory unit 104. The relative-value deriving block 180 defines an effective angular range EA for the selection up/down mode which has an angular dimension equal to the given angle, and which is centered at the reference sound-source angle DC. Preferably, the given angle is chosen so that the hands of the user can be moved in the resultant effective angular range EA without difficulty. The relative-value deriving block 180 divides the effective angular range EA into "m" portions, where "m" denotes a positive integer equal to the number of the types of the control by the operation controlling block 182 (that is, the number of operation items from which one can be selected by the user). Accordingly, the menu picture indicated on the monitor 110 has "m" sub pictures which positionally correspond to the "m" portions of the effective angular range EA respectively, and which represent "m" operation items respectively. The relative-value deriving block 180 may calculate the effective angular range EA from the positive integer "m", the aforesaid basic angle θad, and the reference sound-source angle DC. In this case, the effective angular range EA has an angular dimension equal to mθad. Preferably, the "m" portions of the effective angular range EA are equal in angular dimension. The "m" portions of the effective angular range EA may be different in angular dimension. The operation controlling block 182 decides which of the "m" portions of the effective angular range EA contains the relative angle of the sound source of the currently detected clap and thereby determines which of the "m" operation items is selected by the user. In the case where the number of operation items (the positive integer "m") is three, the relative-value deriving block 180 divides the effective angular range EA into a right portion RAD, a central portion CAD, and a left portion LAD. The central portion CAD is centered at the reference sound-source angle DC. Preferably, each of the right portion RAD, the central portion CAD, and the left portion LAD has a predetermined angular dimension.

With reference to FIG. 15, the user generates a clap at an angular position DL within the left portion LAD of the effective angular range EA to select the operation item of the channel control. The generated clap travels to the sound sensors 114a and 114b before being detected by the sound processor 150. A decision result flag Fm indicative of the detection of the clap is outputted to the system controller 102 from the sound processor 150. In addition, the angle of the sound source of the detected clap is notified to the system controller 102 from the sound processor 150. The system controller 102 decides which of the right portion RAD, the central portion CAD, and the left portion LAD of the effective angular range EA contains the angle of the sound source of the detected clap. Since the clap is generated at the angular position DL within the left portion LAD of the effective angular range EA, the system controller 102 decides that the left portion LAD of the effective angular range EA contains the angle of the sound source of the detected clap. Then, the system controller 102 concludes that the user selects the operation item of the channel control indicated by the sub picture in the menu picture which positionally corresponds to the left portion LAD of the effective angular range EA. When it is concluded that the operation item of the channel control is selected, the system controller 102 controls the graphics signal generator 122 and the video mixer 124 to display a channel control picture 240 on the monitor 110 instead of the menu picture 234.

Figure 16:
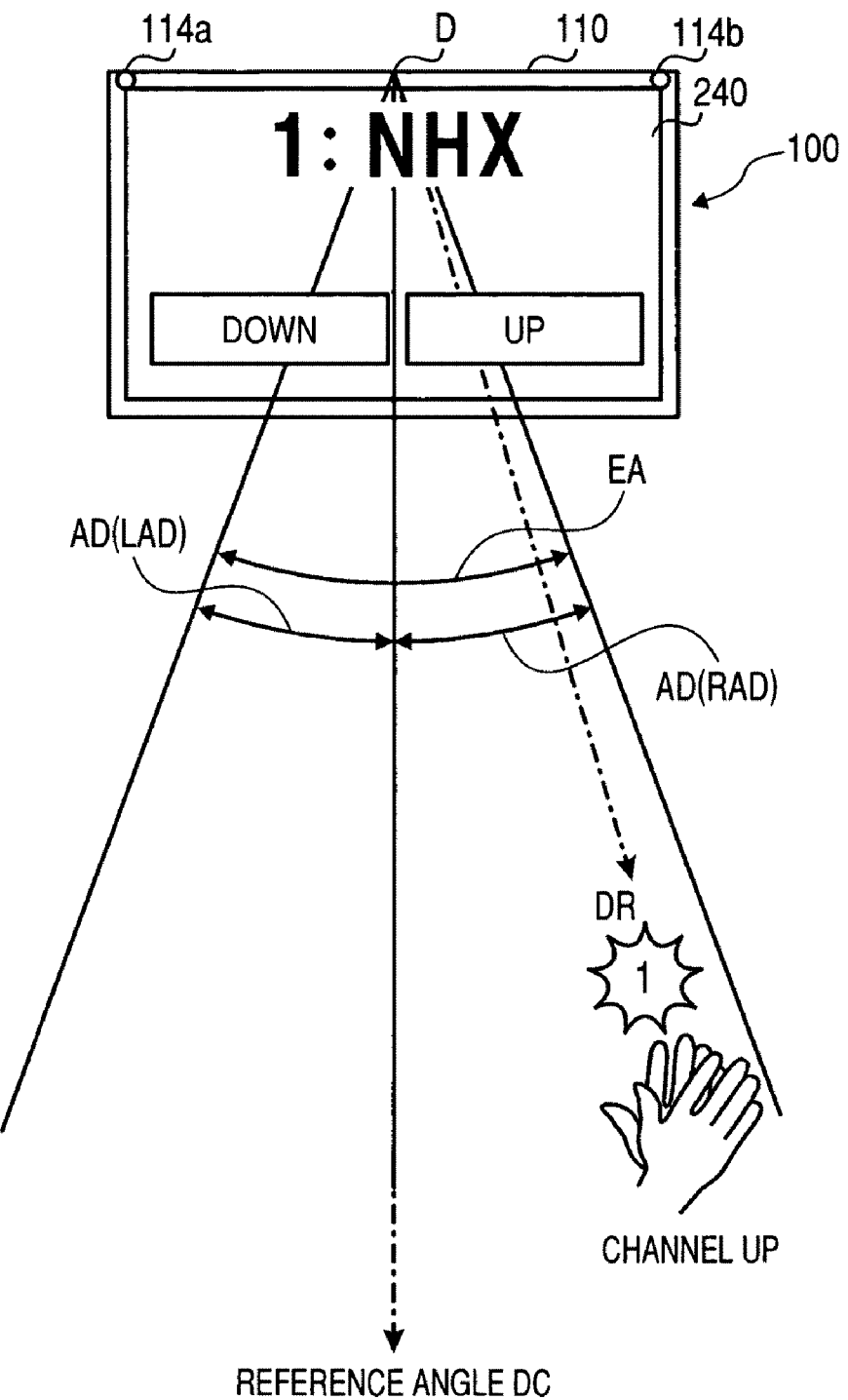
FIG. 16 is a diagram of the front face of the apparatus in FIG. 1, a channel control picture displayed by the monitor in the apparatus, and a clap generated by the user.

With reference to FIGS. 13 and 16, regarding the channel control, the number of the types of the control by the operation controlling block 182 (that is, the number of operation items from which one can be selected by the user) is two. Accordingly, the relative-value deriving block 180 in the system controller 102 sets two sequential selection zones (neighboring selection zones) AD labeled as a right selection zone RAD and a left selection zone LAD respectively. The boundary between the right selection zone RAD and the left selection zone LAD corresponds to the reference sound-source angle DC. Preferably, each of the sequential selection zones AD has a predetermined angular dimension equal to, for example, the aforesaid basic angle θad. An example of the basic angle θad is equal to 5.7 degrees. The relative-value deriving block 180 combines the right selection zone RAD and the left selection zone LAD into an effective angular range EA for the channel control. The effective angular range EA has an angular dimension equal to the basic angle θad multiplied by two (the number of the types of the control by the operation controlling block 182). The relative-value deriving block 180 may first define an effective angular range EA for the channel control. In this case, the relative-value deriving block 180 retrieves a signal representative of a preset angle (equal to, for example, 17.1 degrees) from the memory unit 104, and provides the effective angular range EA which has an angular dimension equal to the present angle, and which is centered at the reference sound-source angle DC. Then, the relative-value deriving block 180 divides the effective angular range EA by two (the number of the types of the control by the operation controlling block 182) to obtain a right selection zone RAD and a left selection zone LAD. When the number of the types of the control by the operation controlling block 182 is two or less, wider sequential selection zones AD or a wider effective angular range EA may be arbitrarily set.

The channel control picture 240 has right and left sub pictures which relate to respective operation items controllable by the operation controlling block 182, and which positionally correspond to the right selection zone RAD and the left selection zone LAD respectively. The operation item related to the right sub picture corresponds to channel up control. The operation item related to the left sub picture corresponds to channel down control. A clap generated by the user in the effective angular range EA to select one from the operation items travels to the sound sensors 114*a* and 114*b* before being detected by the sound processor 150. A decision result flag Fm indicative of the detection of the clap is outputted to the system controller 102 from the sound processor 150. In addition, the angle of the sound source of the detected clap is notified to the system controller 102 from the sound processor 150. The operation controlling block 182 in the system controller 102 decides which of the right selection zone RAD and the left selection zone LAD contains the angle of the sound source of the detected clap. When it is decided that the right selection zone RAD contains the angle of the sound source of the detected clap, the operation controlling block 182 concludes that the user selects the channel up control indicated by the right sub picture in the channel control picture 240. In this case, the operation controlling block 182 controls the television program receiver 108 to implement selected-channel up. When it is decided that the left selection zone LAD contains the angle of the sound source of the detected clap, the operation controlling block 182 concludes that the user selects the channel down control indicated by the left sub picture in the channel control picture 240. In this case, the operation controlling block 182 controls the television program receiver 108 to implement selected-channel down.

With reference to FIG. 16, the user generates a clap at an angular position DR within the right selection zone RAD to select the operation item of the channel up control. The generated clap travels to the sound sensors 114*a* and 114*b* before being detected by the sound processor 150. A decision result flag Fm indicative of the detection of the clap is outputted to the system controller 102 from the sound processor 150. In addition, the angle of the sound source of the detected clap is notified to the system controller 102 from the sound processor 150. The operation controlling block 182 in the system controller 102 decides which of the right selection zone RAD and the left selection zone LAD contains the angle of the sound source of the detected clap. Since the clap is generated at the angular position DR within the right selection zone RAD, the operation controlling block 182 decides that the right selection zone RAD contains the angle of the sound source of the detected clap. Then, the operation controlling block 182 concludes that the user selects the operation item of the channel up control indicated by the sub picture in the channel control picture 240 which positionally corresponds to the right selection zone RAD. When it is concluded that the operation item of the channel up control is selected, the operation controlling block 182 controls the television program receiver 108 to implement selected-channel up. The content-presentation controlling block 184 controls the graphics signal generator 122 and the video mixer 124 to superimpose an ID number and an ID mark (for example, "1:NHX") of the new selected channel over the channel control picture 240 on the monitor 110. In the case where the user generates such a clap twice or more, the implemented selected-channel up corresponds to a channel number equal to the number of times the clap is generated. The content-presentation controlling block 184 measures the lapse of time from the moment of detection of the last clap. The content-presentation controlling block 184 decides whether or not the measured lapse of time reaches a prescribed term. When it is decided that the measured lapse of time reaches the prescribed term, the content-presentation controlling block 184 controls the video mixer 124 to replace the channel control picture 240 on the monitor 110 by a television program picture 232 of the currently selected channel. Thus, the replacement of the channel control picture 240 by the television program picture 232 is implemented on a time-out basis. At that time, the system controller 102 feeds the sound-signal deciding block 172 in the sound processor 150 with the mode signal indicating that the on/off mode is chosen. As a result, the selection up/down mode is replaced by the on/off mode.

Under the condition where the menu picture 234 is indicated on the monitor 110, when the user generates a clap at an angular position within the right portion RAD of the effective angular range EA, the operation item of the sound-volume control is selected. In this case, the content-presentation controlling block 184 controls the graphics signal generator 122 and the video mixer 124 to display a sound-volume control picture 242 instead of the menu picture 234 on the monitor 110. As shown in FIG. 13, the sound-volume control picture 242 has right and left sub pictures indicating sound-volume up control and sound-volume down control respectively. When the user generates a clap at an angular position within the right selection zone RAD, the operation controlling block 182 in the system controller 102 controls the main amplifier 116 to implement sound-volume up. When the user generates a clap at an angular position within the left selection zone LAD, the operation controlling block 182 controls the main amplifier 116 to implement sound-volume down. The content-presentation controlling block 184 decides whether or not the measured lapse of time from the moment of detection of the last clap reaches the prescribed term. When it is decided that the measured lapse of time reaches the prescribed term, the content-presentation controlling block 184 controls the video mixer 124 to replace the sound-volume control picture 242 on the monitor 110 by a television program picture 232 of the currently selected channel. Thus, the replacement of the sound-volume control picture 242 by the television program picture 232 is implemented on a time-out basis. At that time, the system controller 102 feeds the sound-signal deciding block 172 in the sound processor 150 with the mode signal indicating that the on/off mode is chosen. As a result, the selection up/down mode is replaced by the on/off mode.

Under the condition where the menu picture 234 is indicated on the monitor 110, when the user generates a clap at an angular position within the central portion CAD of the effective angular range EA, the operation item of the mute control is selected. In this case, the content-presentation controlling block 184 controls the graphics signal generator 122 and the video mixer 124 to display a mute-control-related picture instead of the menu picture 234 on the monitor 110. The operation controlling block 182 in the system controller 102 controls the main amplifier 116 to mute sounds emitted from the loudspeakers 112*a* and 112*b*. Under the condition where the mute-control-related picture is displayed on the monitor 110 and sounds emitted from the loudspeakers 112*a* and 112*b* are muted, the system controller 102 decides whether or not three successive claps generated at a position within the effective angular range at substantially equal intervals are detected by the sound processor 150. The system controller 102 implements this decision in response to the decision result flag Fj outputted from the sound processor 150. When it is decided that three successive claps are detected, the content-presentation controlling block 184 controls the video mixer 124 to replace the mute-control-picture on the monitor 110 by a television program picture 232 of the currently selected channel. At that time, the system controller 102 feeds the sound-signal deciding block 172 in the sound processor 150 with the mode signal indicating that the on/off mode is chosen. As a result, the selection up/down mode is replaced by the on/off mode.

In the case where the chosen mode is the on/off mode and the power supply of the monitor 110 is in its on state, the system controller 102 decides whether or not four successive claps generated at a position within the effective angular range at substantially equal intervals are detected by the sound processor 150. The system controller 102 implements this decision in response to the decision result flag Fk outputted from the sound processor 150. When it is decided that four successive claps are detected, the system controller 102 change the power supply of the monitor 110 to its off state. As a result, the monitor 110 displays nothing (see the reference numeral 230 in FIG. 13).

In the absence of a detected clap or claps from the prescribed term after the start of the indication of the menu picture 234 by the monitor 110, the selection up/down mode is automatically replaced by the on/off mode on a time-out basis. Thus, the time interval for which a clap or claps are used for the control is limited regarding the selection up/down mode. Accordingly, there is a smaller chance that noise sounds different from signal claps enter the sound sensors 114a and 114b while the selection up/down mode is chosen. Therefore, when the selection up/down mode is chosen, it is possible to provide anti-noise performances comparable to those for the on/off mode.

The effective angular range can be restricted when the selection up/down mode is chosen instead of the on/off mode. In this regard, the anti-noise performances for the selection up/down mode can be higher than those for the on/off mode. As previously mentioned, while the selection up/down mode is chosen, the operation controlling block 182 can implement selected control in response to every detected clap. Thus, it is possible to attain sufficient operability of the television receiver 100 while the selection up/down mode is chosen.

Figure 17:
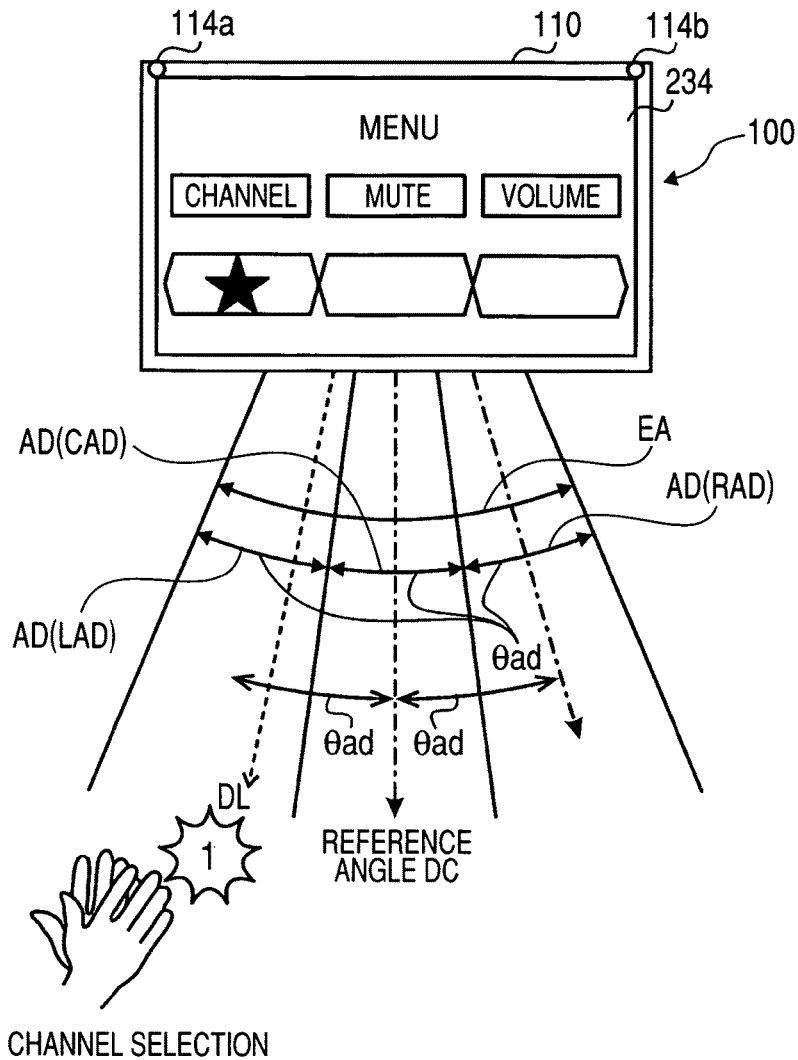
FIG. 17 is a diagram of the front face of the apparatus in FIG. 1, the menu picture displayed by the monitor in the apparatus, a clap generated by the user, a star mark superimposed on the menu picture at a position corresponding to a relative angle of a sound source of the clap.

The relative-value-presentation controlling block 186 in the system controller 102 notifies the graphics signal generator 122 of the relative sound-source angle calculated by the relative-value deriving block 180. The relative-value-presentation controlling block 186 controls the graphics signal generator 122 to produce a graphics signal representing a relative-angle picture indicative of the relative sound-source angle. The relative-value-presentation controlling block 186 controls the graphics signal generator 122 and the video mixer 124 to feed the produced graphics signal to the monitor 110. Thus, the relative-angle picture represented by the graphics signal is displayed by the monitor 110. The displayed relative-angle picture may be superimposed over another picture on the monitor 110. As shown in FIG. 17, the displayed relative-angle picture is a star mark at a position corresponding to the relative sound-source angle. Therefore, it is possible to visually inform the user of the angle of the sound source of the clap generated by the user. Accordingly, the user can visually and surely recognize the error or the difference between an angle of the point of a clap to be generated for selecting a desired operation item and the detected angle of the sound source of the clap actually generated by the user. Thereby, the user can be urged to calibrate an angle of the point of a clap to be generated.

Figure 18:
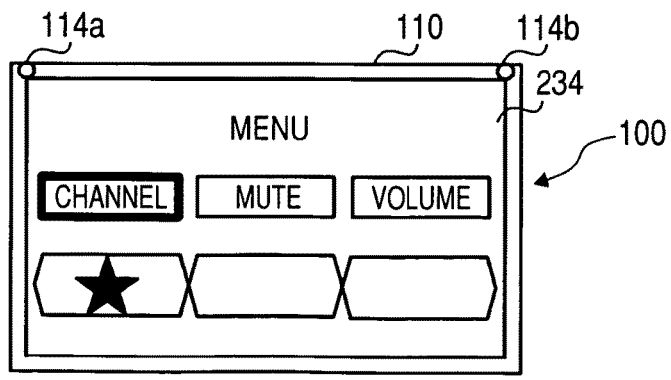
FIG. 18 is a diagram of the front face of the apparatus in FIG. 1, the menu picture displayed by the monitor in the apparatus, the star mark superimposed on the menu picture, and a picture indicative of the selection of channel control which is superimposed on the menu picture.

With reference to FIG. 18, upon the selection of the channel control during the display of the menu picture 234 on the monitor 110, the content-presentation controlling block 184 controls the graphics signal generator 122 to generate a video signal (a graphics signal) representing a channel-control selection picture indicative of the selection of the channel control. Then, the content-presentation controlling block 184 controls the graphics signal generator 122 and the video mixer 124 to feed the generated video signal to the monitor 110 and thereby enable the monitor 110 to display the channel-control selection picture represented by the video signal. As shown in FIG. 18, the displayed channel-control selection picture is a black frame surrounding the sub picture indicative of the operation item of the channel control in the menu picture 234. Alternatively, the content-presentation controlling block 184 may control the graphics signal generator 122 to flicker the sub picture indicative of the operation item of the channel control. At that time, the audio output controlling block 188 may control the sound signal generator 126 to generate a sound signal representing auditory information of the selection of the channel control. In this case, the audio output controlling block 188 controls the sound signal generator 126 and the audio mixer 128 to feed the generated sound signal to at least one of the loudspeaker 112a and 112b through the main amplifier 116. As a result, at least one of the loudspeakers 112a and 112b converts the sound signal into corresponding sounds, and thereby auditorily informs the user of the selection of the channel control. In this way, the fact that user's action to choose the channel control is recognized and accepted by the operation controlling block 182 is fed back to the user on an auditory basis.

The sound-image locating block 190 notifies the sound signal generator 126 of the relative sound-source angle calculated by the relative-value deriving block 180. The sound-image locating block 190 controls the sound signal generator 126 to produce left-channel and right-channel sound signals representing a sound image located at a position corresponding to the relative sound-source angle. The sound-image locating block 190 controls the sound signal generator 126 and the audio mixer 128 to feed the produced left-channel and right-channel sound signals to the left and right loudspeakers 112a and 112b through the main amplifier 116 respectively. The left and right loudspeakers 112a and 112b convert the left-channel and right-channel sound signals into corresponding sounds respectively, and thereby present the sound image located at the position corresponding to the relative sound-source angle. At the same time, the left and right loudspeakers 112a and 112b emit sounds of the selected television program. The sound-image locating block 190 may control the audio mixer 128 so that the selected-television-program sounds emitted from the loudspeakers 112a and 112b will form a sound image at a position corresponding to the relative sound-source angle.

The sound-image locating block 190 may control the sound signal generator 126 to produce a sound signal representing a vocal message related to the relative sound-source angle. In this case, the sound-image locating block 190 controls the sound signal generator 126 and the audio mixer 128 to feed the produced sound signal to at least one of the loudspeakers 112a and 112b through the main amplifier 116. At least one of the loudspeakers 112a and 112b converts the sound signal into the vocal message related to the relative sound-source angle. For example, the vocal message is "right" when the relative sound-source angle indicates that the angle of the currently detected clap is rightward of the reference sound-source angle. The vocal message may be "too right" when the angle of the currently detected clap is rightward of the reference sound-source angle and the sound source of the currently detected clap is outside the effective angular range.

The sound-image locating block 190 may control the sound signal generator 126 to produce left-channel and right-channel sound signals representing a beep or a whistle and causing a sound image located at a position corresponding to the relative sound-source angle. In this case, the sound-image locating block 190 controls the sound signal generator 126 and the audio mixer 128 to feed the produced left-channel and right-channel sound signals to the left and right loudspeakers 112*a* and 112*b* through the main amplifier 116 respectively. The left and right loudspeakers 112*a* and 112*b* convert the left-channel and right-channel sound signals into the beep or the whistle while presenting the sound image located at the position corresponding to the relative sound-source angle. In this way, the relative sound-source angle can be auditorily fed back to the user.

With reference to FIG. 18, upon the selection of the channel control during the display of the menu picture 234 on the monitor 110, the sound-image locating block 190 may control the sound signal generator 126 to produce a sound signal representing a vocal message related to the selection of the channel control. In this case, the sound-image locating block 190 controls the sound signal generator 126 and the audio mixer 128 to feed the produced sound signal to at least one of the loudspeakers 112*a* and 112*b* through the main amplifier 116. At least one of the loudspeakers 112*a* and 112*b* converts the sound signal into the vocal message related to the selection of the channel control. For example, the vocal message is "channel control is selected".

As understood from the above description, it is possible to auditorily inform the user of the angle of the sound source of the clap generated by the user. Accordingly, the user can surely recognize the error or the difference between an angle of the point of a clap to be generated for selecting a desired operation item and the detected angle of the sound source of the clap actually generated by the user. Thereby, the user can be urged to calibrate an angle of the point of a clap to be generated.

Informing the user of the angle of the sound source of the clap generated by the user may be in the above-mentioned visual way, the above-mentioned auditory way, or a combination of the above-mentioned visual way and the above-mentioned auditory way. It is preferable to more effectively urge the user to calibrate an angle of the point of a clap to be generated.

In summary, the television receiver 100 includes the two spaced sound sensors 114*a* and 114*b*. By processing output signals from the sound sensors 114*a* and 114*b*, it is possible to surely detect the angle (angular position) of a source of a sound wave reaching the sound sensors 114*a* and 114*b* with respect to the front face of the television receiver 100. The detected angle of a source of a first sound wave or first successive sound waves is labeled as a reference angle. A signal representing the reference angle is stored in the memory unit 104. Under the condition where the signal representing the reference angle is already stored in the memory unit 104, when a second sound wave reaching the sound sensors 114*a* and 114*b* is detected, calculation is given of the angle of a source of the second sound wave relative to the reference angle. The operation controlling block 182 operates to control the condition or conditions of the television receiver 100 in response to the calculated relative angle of the source of the second sound wave. Accordingly, by generating such a sound wave at a given angular position for selecting one from operation items about the control of the television receiver 100, the user is allowed to control the television receiver 100 regarding the selected operation item. Thus, the television receiver 100 can be operated or controlled in various ways as the aforesaid given angular position is changed by the user.

Second Embodiment

Figure 19:
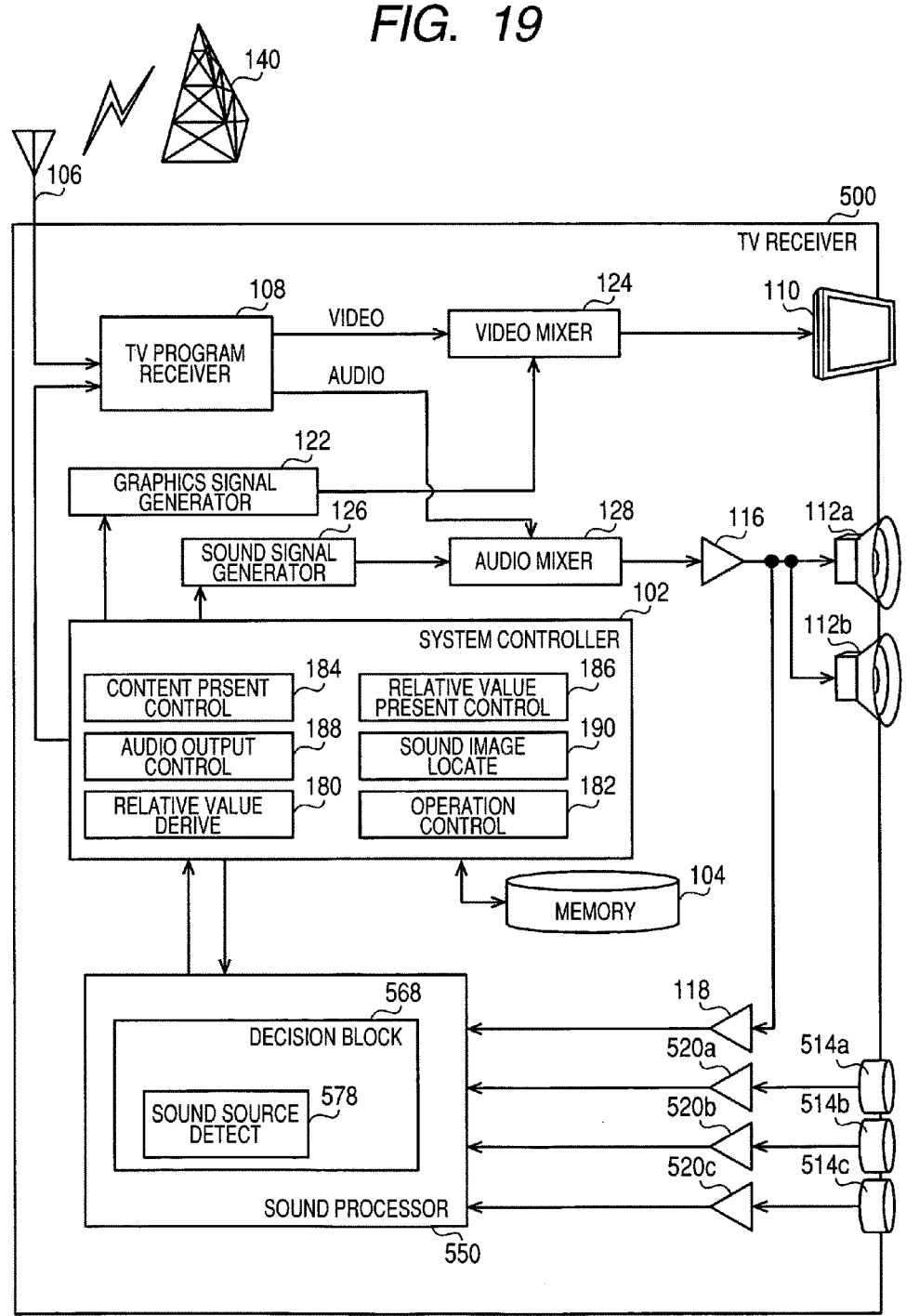
FIG. 19 is a block diagram of an electronic or electric apparatus according to a second embodiment of this invention.

FIG. 19 shows an electronic or electric apparatus 500 in a second embodiment of this invention. The electronic or electric apparatus 500 is similar to the electronic or electric apparatus 100 except for design changes mentioned hereafter. The electronic or electric apparatus 500 is, for example, a television receiver. The electronic or electric apparatus 500 may be an audio apparatus, an air conditioner, a personal computer, a music player, a car navigation apparatus, a game machine, or a DVD player.

As shown in FIG. 19, the television receiver 500 includes at least three sound sensors (sound-to-electric transducers or microphones) 514*a*, 514*b*, and 514*c*, audio amplifiers 520*a*, 520*b*, and 520*c*, and a sound processor 550. The sound processor 550 includes a decision block 568 which implements a sound-source detecting block 578.

The sound sensor 514*a* is located at a position on a left edge part of the front face of the television receiver 500. The sound sensor 514*a* is electrically followed by the audio amplifier 520*a*. The sound sensor 514*b* is located at a position on a right edge part of the front face of the television receiver 500. The sound sensor 514*b* is electrically followed by the audio amplifier 520*b*. The sound sensor 514*c* is located at a position on the front face of the television receiver 500. The position of the sound sensor 514*c* substantially coincides with the middle point between the sound sensors 514*a* and 514*b*. Thus, the sound sensors 514*a*, 514*b*, and 514*c* are horizontally spaced. The sound sensors 514*a*, 514*b*, and 514*c* may be replaced by four or more sound sensors.

The sound sensors 514*a*, 514*b*, and 514*c* convert applied sound waves into sound signals, and output the sound signals to the audio amplifiers 520*a*, 520*b*, and 520*c* respectively. The audio amplifier 520*a* enlarges the sound signal outputted from the sound sensor 514*a*, and outputs the enlarged sound signal to the sound processor 550. The audio amplifier 520*b* enlarges the sound signal outputted from the sound sensor 514*b*, and outputs the enlarged sound signal to the sound processor 550. The audio amplifier 520*c* enlarges the sound signal outputted from the sound sensor 514*c*, and outputs the enlarged sound signal to the sound processor 550. The sound processor 550 detects the angle (angular position) of a source of a sound represented by the sound signals outputted from the audio amplifiers 520*a*, 520*b*, and 520*c*. The detected angle is measured with respect to the front face of the television receiver 500.

Figure 20:
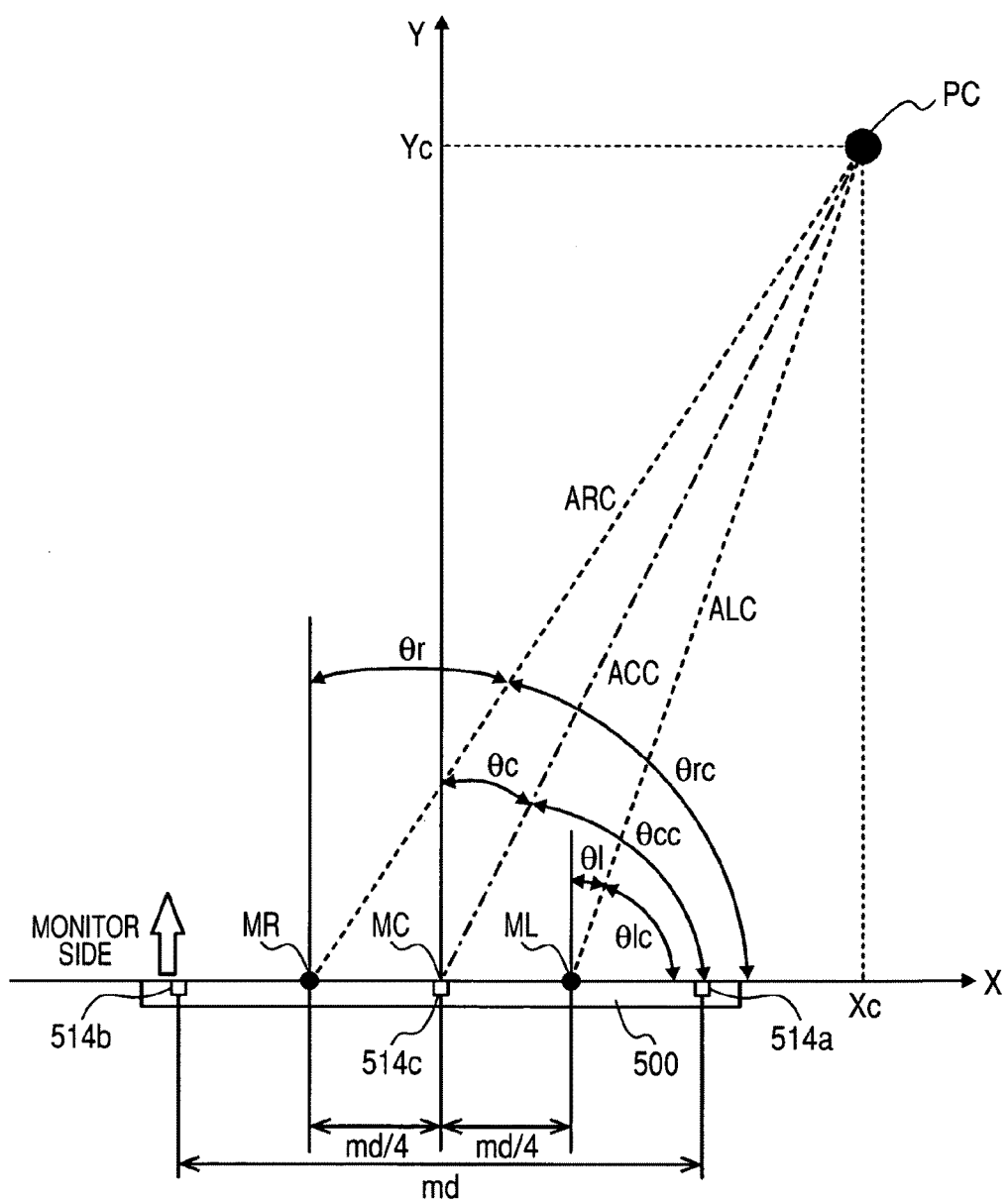
FIG. 20 is a diagram of the positional and angular relations among the apparatus in FIG. 19, sound sensors in the apparatus, and a sound source generating a sound wave reaching the sound sensors as seen from above.

With reference to FIG. 20, there are three points MC, MR, and ML on the front face of the television receiver 500. The point MC coincides with the middle point between the sound sensors 514*a* and 514*b* where the sound sensor 514*c* is located. The point ML coincides with the middle point between the sound sensors 514*a* and 514*c*. The point MR coincides with the middle point between the sound sensors 514*b* and 514*c*. A sound-source angle θcc detected on the basis of a sound wave applied to the sound sensors 514*a* and 514*b* is measured as seen from the middle point MC therebetween. A sound-source angle θlc detected on the basis of a sound wave applied to the sound sensors 514*a* and 514*c* is measured as seen from the middle point ML therebetween. A sound-source angle θrc detected on the basis of a sound wave applied to the sound sensors 514b and 514c is measured as seen from the middle point MR therebetween.

The detected sound-source angles θcc, θlc, and θrc are measured from the front face of the television receiver 500. There are detected sound-source angles θc, θl, and θr. The sound-source angles θcc and θc are complementary. The sound-source angles θlc and θl are complementary. The sound-source angles θrc and θr are complementary.

The sound-source angle θcc is given according to the previously-indicated equation (5) including a term using the distance "md" between the sound sensors 514a and 514b. The distance between the sound sensors 514a and 514c is equal to "md/2". The distance between the sound sensors 514b and 514c is equal to "md/2" also. The distance "md" and the distance "md/2" are equal to, for example, 100 cm and 50 cm respectively.

Figure 21:
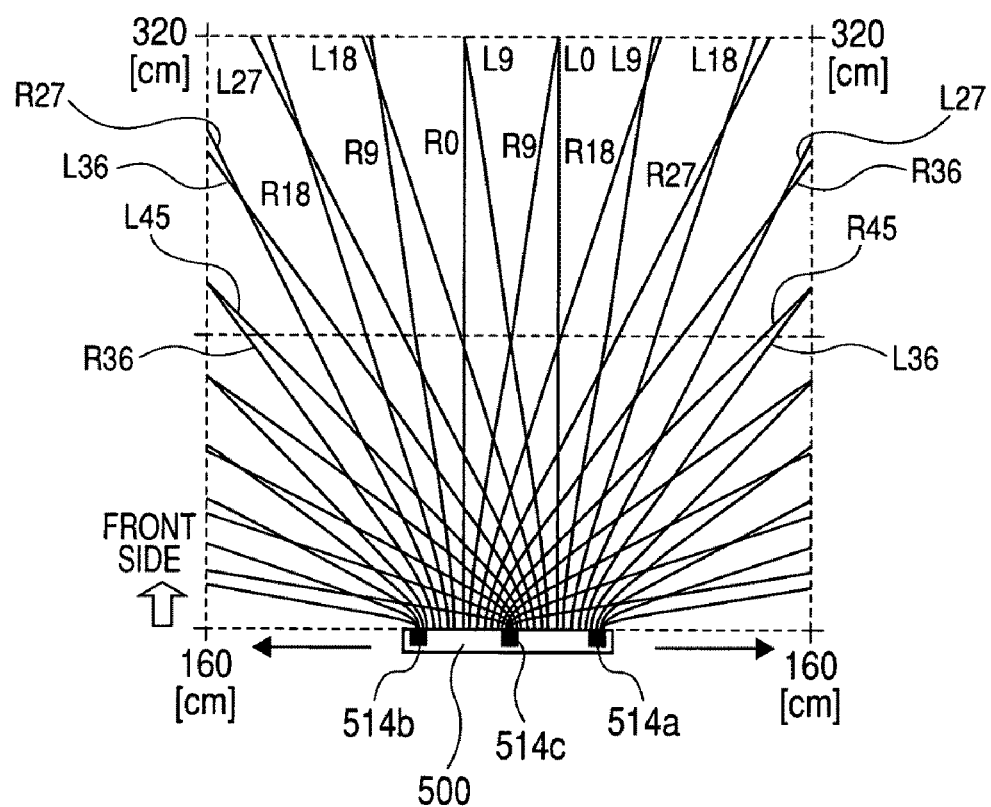
FIG. 21 is a diagram of the apparatus in FIG. 19 as seen from above, the sound sensors in the apparatus, and contour lines indicating angles of a sound source which are obtained by a computer simulation.

With reference to FIG. 21, the television receiver 500 is shown as seen from above. The longitudinal direction of the television receiver 500 is taken as an X axis, and a perpendicular line with respect to the front face of the television receiver 500 which extends from the television receiver center D is taken as a Y axis. There are contour lines R0-R81 (only R0-R45 in FIG. 21) of detected sound-source angles θr spaced at 9-degree intervals and extending between 0 degree and 81 degrees in absolute value. There are contour lines L0-L81 (only L0-L45 in FIG. 21) of detected sound-source angles θl spaced at 9-degree intervals and extending between 0 degree and 81 degrees in absolute value. The sound source is on the line R0 when the detected sound-source angle θr is equal to 0 degree. The sound source is on the right line R9 when the detected sound-source angle θr is equal to 9 degrees. The sound source is on the left line R9 when the detected sound-source angle θr is equal to −9 degrees. The sound source is on the right line R36 when the detected sound-source angle θr is equal to 36 degrees. The sound source is on the left line R36 when the detected sound-source angle θr is equal to −36 degrees. Similarly, the sound source is on the line L0 when the detected sound-source angle θl is equal to 0 degree. The sound source is on the right line L9 when the detected sound-source angle θl is equal to 9 degrees. The sound source is on the left line L9 when the detected sound-source angle θl is equal to −9 degrees. The sound source is on the right line L36 when the detected sound-source angle θl is equal to 36 degrees. The sound source is on the left line L36 when the detected sound-source angle θl is equal to −36 degrees.

In FIG. 21, the XY position, that is, the two-dimensional position, of a sound source of a currently detected clap (pulse-like sound) can be expressed by the coordinates of the point where the line of the currently detected sound-source angle θr (or θrc) and the line of the currently detected sound-source angle θl (or θlc) intersect. Generally, the XY position of the sound source (that is, the XY position of the user) can be derived from at least two of the detected sound source angles θcc, θlc, and θrc or two of the detected sound-source angles θc, θl, and θr.

With reference to FIG. 20, the XY position PC of the sound source or the user is calculated from the detected sound source angles θlc and θrc. Each of the sound source angles θlc and θrc is given according to the previously-indicated equation (3). Specifically, the XY position PC of the sound source coincides with a point of intersection between the line of the detected sound-source angle θlc and the line of the detected sound-source angle θrc which start from the middle points ML and MR respectively. The line extending between the points ML and PC is expressed as follows.

$$y = ALC \cdot x - (md/4) \cdot ALC \quad (7)$$

where ALC denotes a slope equal to tan(θlc). The line extending between the points MR and PC is expressed as follows.

$$y = ARC \cdot x + (md/4) \cdot ARC \quad (8)$$

where ARC denotes a slope equal to tan(θrc). Thus, the coordinates (Xc, Yc) of the point of intersection between these two lines are given as follows.

$$Xc = -(md/4) \cdot (ARC + ALC)/(ARC - ALC) \quad (9)$$

$$Yc = -(md/2) \cdot ARC \cdot ALC/(ARC - ALC) \quad (10)$$

The distance "ddc" between the center D of the front face of the television receiver 500 and the XY position PC of the sound source is given by the following equation.

$$ddc = \sqrt{Xc^2 + Yc^2} \quad (11)$$

The slope ACC of the line extending between the points PC and MC is given as follows.

$$ACC = \arctan(Yc/Xc) \quad (12)$$

In this way, the XY position PC of the sound source is determined on the basis of the line of the detected sound-source angle θlc and the line of the detected sound-source angle θrc which start from the middle points ML and MR respectively. Alternatively, the XY position PC of the sound source may be calculated as a position of intersection between the line of the detected sound-source angle θcc and the line of the detected sound-source angle θlc which start from the middle points MC and ML respectively. The XY position PC of the sound source may be calculated as a position of intersection between the line of the detected sound-source angle θcc and the line of the detected sound-source angle θrc which start from the middle points MC and MR respectively.

Averaging may be utilized to determine the final XY position PC of the sound source. Specifically, the first XY position PC of the sound source is determined on the basis of the line of the detected sound-source angle θlc and the line of the detected sound-source angle θrc which start from the middle points ML and MR respectively. The second XY position PC of the sound source is determined on the basis of the line of the detected sound-source angle θcc and the line of the detected sound-source angle θlc which start from the middle points MC and ML respectively. The third XY position PC of the sound source is determined on the basis of the line of the detected sound-source angle θcc and the line of the detected sound-source angle θrc which start from the middle points MC and MR respectively. Then, the first, second, and third XY positions PC are averaged to give the final XY position PC. In this case, the determination of the final XY position PC of the sound source has a high accuracy.

Figure 22:
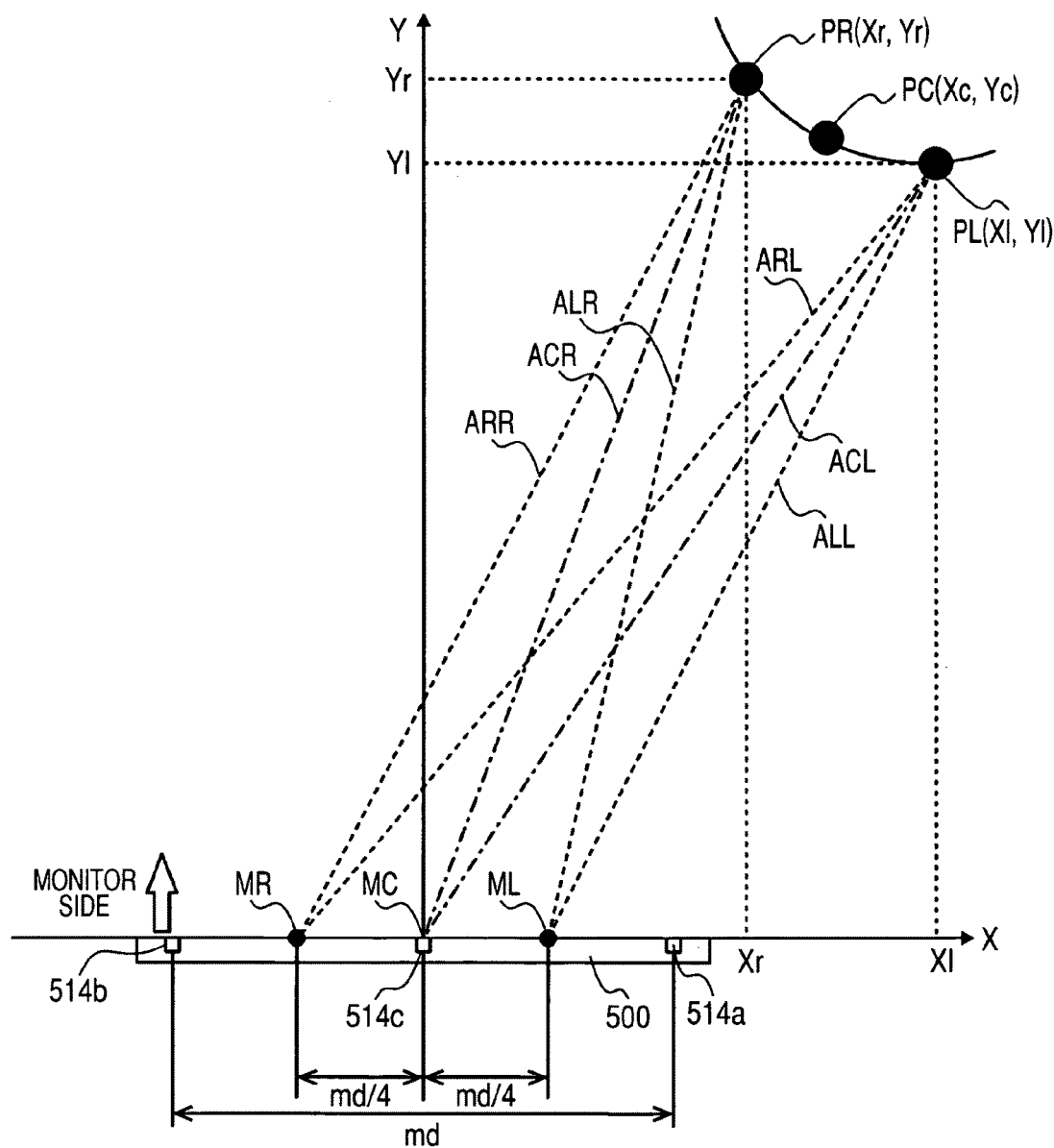
FIG. 22 is a diagram of the positional and angular relations among the apparatus in FIG. 19, the sound sensors in the apparatus, and sound sources located at different positions and each generating a sound wave reaching the sound sensors as seen from above.

With reference to FIG. 22, in the case where the on/off mode is chosen, the sound-source detecting block 578 determines a sound-source position on the basis of a clap or claps detected during a prescribed term. The sound-source detecting block 578 informs the system controller 102 of the determined sound-source position. The system controller 102 labels the sound-source position as a reference position PC. After the reference position PC is given, the sound-source detecting block 578 determines a sound-source position for every later detected clap relative to the reference position PC. In other words, the sound-source detecting block 578 calculates the relative position between the sound source of the former clap or claps (causing the reference position PC) and the sound source of the later clap. In FIG. 22, PR denotes a determined sound-source position located rightward of the reference position PC as seen therefrom toward the television receiver 500. Further, PL denotes a determined sound-source position located leftward of the reference position PC as seen therefrom toward the television receiver 500.

When the user facing the television receiver 500 generates a clap at a position leftward of the reference position PC, the position PL(Xl, Yl) of the sound-source of the clap is calculated according to the previously-indicated equations (9) and (10). The slopes ARL and ALL in FIG. 22 are used as the slopes ARC and ALC in the equations (9) and (10). When the user facing the television receiver 500 generates a clap at a position rightward of the reference position PC, the position PR(Xr, Yr) of the sound-source of the clap is calculated according to the equations (9) and (10). The slopes ARR and ALR in FIG. 22 are used as the slopes ARC and ALC in the equations (9) and (10).

In the case where the selection up/down mode is chosen, the operation controlling block 182 in the system controller 102 implements the clap-responsive control of the condition or conditions of the television receiver 500 only when the angle of the sound source of the clap currently detected by the sound processor 550 is within an effective angular range. The side borders of the effective angular range is set on the basis of a basic angle $\theta$ad given by the previously-indication equation (6).

Figure 23:
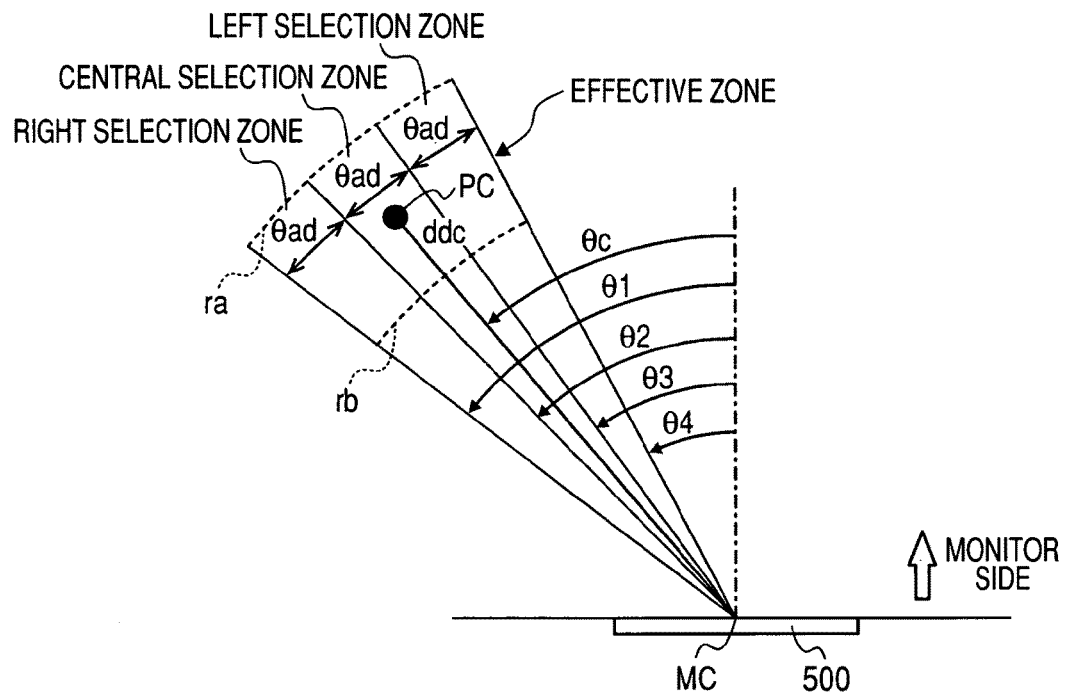
FIG. 23 is a diagram of the apparatus in FIG. 19 as seen from above, a reference sound-source position, selection zones, and a quasi-trapezoidal effective zone.

With reference to FIG. 23, the distance "ddc" between the middle point MC on the television receiver 500 and the reference point PC(Xc, Yc) is calculated according to the following relation.

$$ddc^2 = Xc^2 + Yc^2 \qquad (13)$$

The calculated distance "ddc" is placed in the equation (6) and the distance "sd" is set 20 cm, and then the basic angle $\theta$ad is determined by referring to the equation (6). The system controller 102 stores a signal representative of the determined basic angle $\theta$ad into the memory unit 104. Each time the reference position PC is given, the distance "ddc" is calculated according to the equation (13) and then the basic angle $\theta$ad is determined on the basis of the calculated distance "ddc". Alternatively, the basic angle $\theta$ad may be preset while a fixed value is used as the distance "ddc". This presetting of the basic angle $\theta$ad is similar to that in the first embodiment of this invention.

Preferably, there is a set of a right selection zone, a central selection zone, and a left selection zone each having an angular dimension equal to the basic angle $\theta$ad. The right selection zone, the central selection zone, and the left selection zone constitute the effective angular range which has an angular dimension equal to 3$\theta$ad. Thus, the right selection zone, the central selection zone, and the left selection zone form a right portion, a central portion, and a left portion of the effective angular range respectively. The effective angular range is centered at the angle $\theta$c of the reference position PC. In FIG. 23, the effective angular range extends between a first prescribed angle $\theta$4 less than the angle $\theta$c and a second prescribed angle $\theta$1 greater than the angle $\theta$c.

As previously mentioned, the distance "ddc" between the middle point MC on the television receiver 500 and the reference point PC(Xc, Yc) is calculated. Preferably, the effective angular range is limited in the distance direction (the radial direction). There are a first given distance "ra" and a second given distance "rb" from the middle point MC on the television receiver 500. The first given distance "ra" is greater than the distance "ddc". The second given distance "rb" is smaller than the distance "ddc". The effective angular range is narrowed and confined to a quasi-trapezoidal effective zone radially extending between the circumference of the first given distance "ra" and the circumference of the second given distance "rb". The effective zone is used instead of the effective angular range. The effective zone is substantially centered at the reference position PC, and has limited circumferential and radial dimensions. Preferably, the setting of the effective zone depends on required accuracy and reliability for the clap detection. In FIG. 23, the circumference of the first given distance "ra" and the circumference of the second given distance "rb" are expressed as broken lines.

The effective zone extending radially outward of the circumference of the second given distance "rb" provides the advantage that television program sounds emitted from the loudspeakers 112a and 112b and a sound generated by a touch to the body of the television receiver 500 can be prevented from being erroneously detected as effective claps generated by the user.

After the reference position PC is given, the relative-value deriving block 180 in the system controller 102 calculates the position of a sound source of a currently detected clap relative to the reference position PC. In other words, the relative-value deriving block 180 calculates the relative position between the sound source of the former clap or claps (causing the reference position PC) and the sound source of the currently detected clap. The relative-value deriving block 180 informs the operation controlling block 182 of the calculated relative sound-source position. The operation controlling block 182 decides which of the right portion, the central portion, and the left portion of the effective angular range (which of the right selection zone, the central selection zone, and the left selection zone) contains the relative sound-source position. Then, the operation controlling block 182 controls the condition or conditions of the television receiver 500 in response to the result of the foregoing decision.

As previously mentioned, the effective angular range is centered at the angle $\theta$c of the reference position PC. The effective angular range has an angular dimension equal to 3$\theta$ad. In the case where the effective angular range is divided into a right portion, a central portion, and a left portion each having an angular dimension equal to $\theta$ad, these portions are in the following relation. As shown in FIG. 23, the right portion extends between the line of an angle $\theta$1 and the line of an angle $\theta$2. The central portion extends between the line of the angle $\theta$2 and the line of an angle $\theta$3. The left portion extends between the line of the angle $\theta$3 and the line of an angle $\theta$4. The right portion, the central portion, and the left portion form a right selection zone, a central selection zone, and a left selection zone respectively.

The relative-value deriving block 180 determines the borders of the right, central, and left selection zones and calculates the angles $\theta$1, $\theta$2, $\theta$3, and $\theta$4 from the angle $\theta$c of the reference position PC and the basic angle $\theta$ad according to the following equations.

$$\theta 1 = \theta c + \theta ad \cdot 3/2 \qquad (14)$$

$$\theta 2 = \theta c + \theta ad/2 \qquad (15)$$

$$\theta 3 = \theta c - \theta ad/2 \qquad (16)$$

$$\theta 4 = \theta c - \theta ad \cdot 3/2 \qquad (17)$$

The relative-value deriving block 180 informs the operation controlling block 182 of the calculated angles $\theta$1, $\theta$2, $\theta$3, and $\theta$4. The operation controlling block 182 refers to the angles $\theta$1, $\theta$2, $\theta$3, and $\theta$4, and thereby which of the right, central, and left selection zones contains the relative sound-source position calculated by the relative-value deriving block 180. For a required sound sensing accuracy in a specified range, the angles θ1 and θ4 may not be calculated and hence the borders of the effective angular range may not be set.

It should be noted that in the previously-mentioned first embodiment of this invention, an effective angular range can be set in a way similar to the above.

The television receiver 500 can respond to a clap generated at a position within the effective angular range. As previously mentioned, the effective angular range is narrowed and confined to an effective zone substantially centered at the reference position PC and having limited circumferential and radial dimensions. The television receiver 500 can be prevented from erroneously responding to a clap generated at a position outside the effective zone. Preferably, the effective zone circumferentially extends between the given angles θ1 and θ4, and radially extends up to the circumference of the first given distance "ra". The effective zone may radially extend between the circumference of the first given distance "ra" and the circumference of the second given distance "rb". The given angle θ1 is greater than the angle θc of the reference position PC. The given angle θ4 is less than the angle θc. The first given distance "ra" is greater than the distance "ddc" between the reference position PC and the television receiver 500. The second given distance "rb" is smaller than the distance "ddc". The setting of the effective zone can surely prevent wrong detection of a clap.

Figure 24:
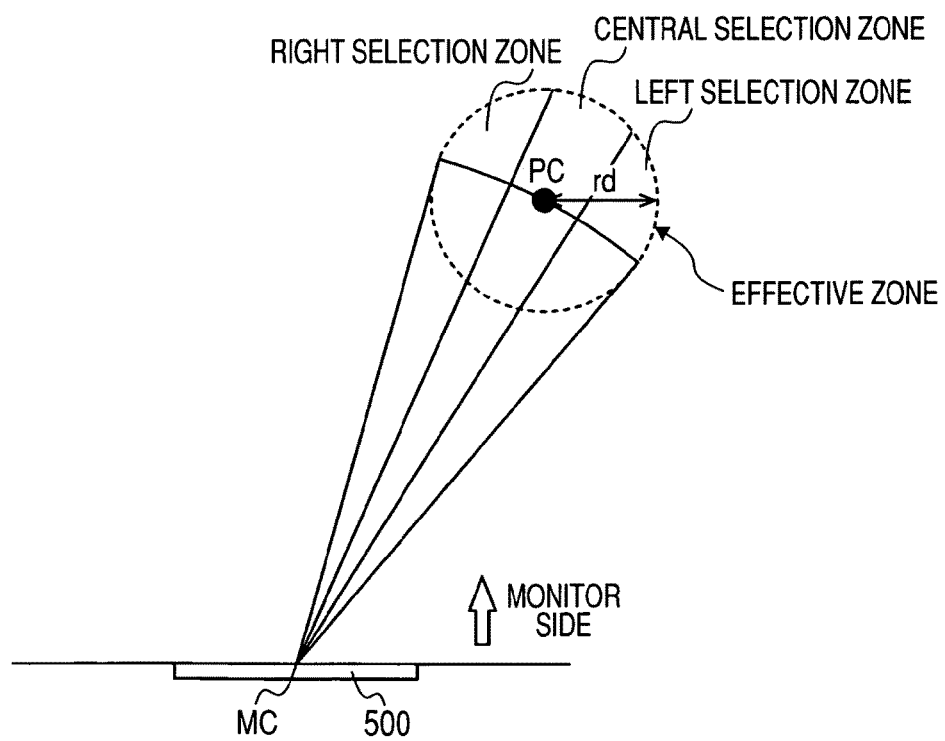
FIG. 24 is a diagram of the apparatus in FIG. 19 as seen from above, a reference sound-source position, selection zones, and an effective circle.

As shown in FIG. 24, the effective angular range may be narrowed and confined to an effective circle substantially centered at the reference position PC and having a given radius "rd". The effective circle is used instead of the effective angular range. In FIG. 24, the effective circle is denoted by the broken line. The given radius "rd" is calculated according to the following relation.

$$rd^2 = (x-Xc)^2 + (y-Yc)^2 \qquad (18)$$

where Xc and Yc indicate the coordinates of the reference position PC and "x" and "y" indicate the coordinates of the point where the radius line and the tangential line with respect to the circle and starting from the middle point MC on the television receiver 500 meet.

Preferably, the radius "rd" is smaller than the distance "ddc" between the reference position PC and the television receiver 500. The effective circle can easily be recognized by the user, and convenience can be improved. The effective circle is divided into right, central, and left selection zones defined by given angles θ1, θ2, θ3, and θ4 similarly to the effective zone in FIG. 23.

With reference to FIG. 25, when three successive claps generated at a position within the effective angular range at substantially equal intervals are detected by the sound processor 550 in the case where the on/off mode is chosen, the menu picture 234 is indicated on the monitor 110 and the on/off mode is replaced by the selection up/down mode. The sound-source detecting block 578 in the sound processor 550 determines the position of the sound source of each of the detected three successive claps according to the previously-indicated equations (9) and (10). The sound-source detecting block 578 informs the system controller 102 of the determined sound-source position. The system controller 102 labels the sound-source position as a reference position PC.

As shown in FIG. 25, a sub picture for the sound-volume control, a sub picture for the mute control, and a sub picture for the channel control extend in a right area, a central area, and a left area in the menu picture 234, respectively. The relative-value deriving block 180 in the system controller 102 stores a signal representative of the reference position PC into the memory unit 104.

After the reference position PC is given, the relative-value deriving block 180 calculates the position of a sound source of a currently detected clap relative to the reference position PC. The relative-value deriving block 180 informs the operation controlling block 182 of the calculated relative sound-source position. With reference to FIG. 26, the operation controlling block 182 decides which of the right selection zone, the central selection zone, and the left selection zone contains the relative sound-source position. Then, the operation controlling block 182 controls the condition or conditions of the television receiver 500 in response to the result of the foregoing decision.

To select the sound-volume control, the user generates a clap at a position PR appreciably distant from the reference position PC in the rightward direction. The generated clap travels to the sound sensors 514a, 514b, and 514c before being detected by the sound processor 550. The sound-source detecting block 578 in the sound processor 550 determines the position PR of the sound source of the detected clap, and informs the system controller 102 of the determined sound-source position PR. The relative-value deriving block 180 in the system controller 102 calculates the position of the sound source of the detected clap relative to the reference position PC. The relative-value deriving block 180 informs the operation controlling block 182 and the relative-value-presentation controlling block 186 of the calculated relative sound-source position. The operation controlling block 182 decides which of the right selection zone, the central selection zone, and the left selection zone contains the relative sound-source position. Since the position PR is appreciably distant from the reference position PC in the rightward direction, the operation controlling block 182 decides that the right selection zone contains the relative sound-source position. Then, the operation controlling block 182 concludes that the sound-volume control corresponding to the right selection zone is selected by the user.

The relative-value-presentation controlling block 186 notifies the graphics signal generator 122 of the relative sound-source position calculated by the relative-value deriving block 180. The relative-value-presentation controlling block 186 controls the graphics signal generator 122 to produce a graphics signal representing a relative-position picture indicative of the relative sound-source position. The relative-value-presentation controlling block 186 controls the graphics signal generator 122 and the video mixer 124 to feed the produced graphics signal to the monitor 110. Thus, the relative-position picture represented by the graphics signal is displayed by the monitor 110. As shown in FIG. 26, the displayed relative-position picture is a star mark at a location corresponding to the relative sound-source position.

Upon the selection of the sound-volume control during the display of the menu picture 234 on the monitor 110, the content-presentation controlling block 184 controls the graphics signal generator 122 to generate a video signal (a graphics signal) representing a sound-volume-control selection picture indicative of the selection of the sound-volume control. Then, the content-presentation controlling block 184 controls the graphics signal generator 122 and the video mixer 124 to feed the generated video signal to the monitor 110 and thereby enable the monitor 110 to display the sound-volume-control selection picture represented by the video signal. As shown in FIG. 26, the displayed sound-volume-control selection picture is a black frame surrounding the sub picture indicative of the operation item of the sound-volume control in the menu picture 234.

In summary, the television receiver 500 includes the three spaced sound sensors 114a, 114b, and 114c. By processing output signals from the sound sensors 114a, 114b, and 114c, it is possible to surely detect the position (XY position or two-dimensional position) of a source of a sound wave reaching the sound sensors 114a, 114b, and 114c with respect to the front face of the television receiver 500. The detected position of a source of a first sound wave or first successive sound waves is labeled as a reference position PC. A signal representing the reference position PC is stored in the memory unit 104. Under the condition where the signal representing the reference position PC is already stored in the memory unit 104, when a second sound wave reaching the sound sensors 114a, 114b, and 114c is detected, calculation is given of the position (XY position or two-dimensional position) of a source of the second sound wave relative to the reference position PC. The operation controlling block 182 operates to control the condition or conditions of the television receiver 500 in response to the calculated relative position of the source of the second sound wave. Accordingly, by generating such a sound wave at a given position for selecting one from operation items about the control of the television receiver 500, the user is allowed to control the television receiver 500 regarding the selected operation item. Thus, the television receiver 500 can be controlled or operated in various ways as the aforesaid given position is changed by the user.

After the reference position PC is given, the television receiver 500 can respond to only a clap or claps generated within the effective angular range. As previously mentioned, the effective angular range is narrowed and confined to the effective zone substantially centered at the reference position PC and having the limited circumferential and radial dimensions. Therefore, the television receiver 500 can be prevented from operating in response to a sound or sounds generated outside the effective zone.

Third Embodiment

Figure 27:
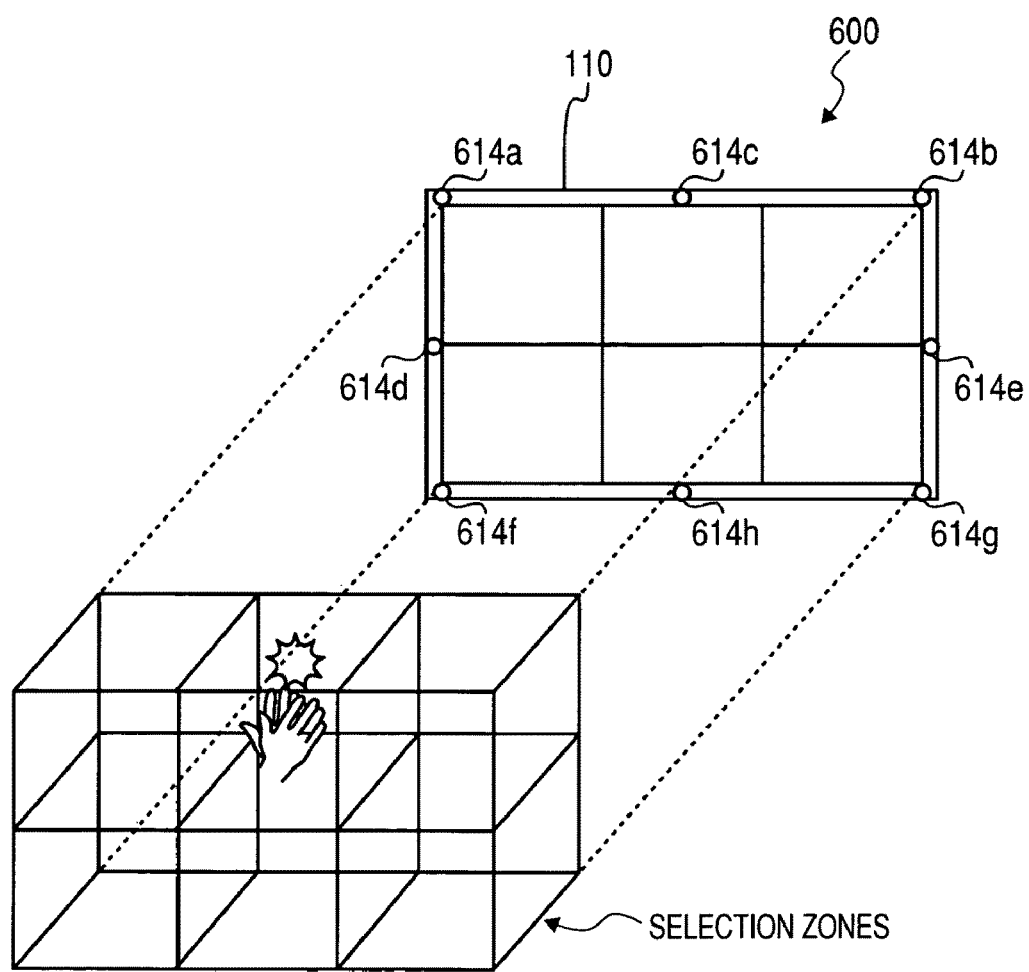
FIG. 27 is a perspective diagram of a front face of an electronic or electric apparatus in a third embodiment of this invention, a clap generated by a user, and selection zones.

FIG. 27 shows an electronic or electric apparatus 600 in a third embodiment of this invention. The electronic or electric apparatus 600 is similar to the electronic or electric apparatus 500 except for design changes mentioned hereafter. The electronic or electric apparatus 600 is, for example, a television receiver. The electronic or electric apparatus 600 may be an audio apparatus, an air conditioner, a personal computer, a music player, a car navigation apparatus, a game machine, or a DVD player.

As shown in FIG. 27, the television receiver 600 includes eight sound sensors (sound-to-electric transducers or microphones) 614a-614h. The sound sensors 614a, 614b, 614f, and 614g are provided on the upper left corner, the upper right corner, the lower left corner, and the lower right corner of the front face of the television receiver 600, respectively. The sound sensors 614c and 614h are located at the middle point in the upper edge and the middle point in the lower edge of the front face of the television receiver 600, respectively. The sound sensors 614d and 614e are located at the middle point in the left edge and the middle point in the right edge of the front face of the television receiver 600, respectively. The XYZ position (three-dimensional position) of a sound source of a clap reaching the sound sensors 614a-614h can be determined by processing the output signals from the sound sensors 614a-614h.

After the effective zone is given, the television receiver 600 can respond to only a clap or claps generated within the effective zone. As shown in FIG. 27, the effective zone is divided into six portions corresponding to six selection zones respectively. Thus, a menu picture or another picture displayed by the monitor 110 can indicate up to six different types of the contents of (six different choices about) the control by the operation controlling block 182.

There are the eight sound sensors 614a-614h. In the case where three different types of the contents of (three different choices about) the control by the operation controlling block 182 are in a menu picture or another picture displayed by the monitor 110, it is possible attain higher accuracies for the recognition of a clap and the calculation of the position of the sound source of the clap.

Fourth Embodiment

A fourth embodiment of this invention is similar to one of the first to third embodiments thereof except for design changes mentioned hereafter. According to the fourth embodiment of this invention, a signal representative of a typical clap generated by the user is previously registered in the memory unit 104. The signal of the typical clap is sent from the memory unit 104 to the sound processor 150 or 550 by the system controller 102. The sound processor 150 or 550 detects every clap reaching the sound sensors 114a and 114b (114a-114c or 114a-114h). The sound processor 150 or 550 compares every detected clap with the typical clap to decide whether or not the detected clap is generated by the user. The sound processor 150 or 550 uses the detected clap which is decided to be generated by the user. The sound processor 150 or 550 ignores the detected clap which is decided to be not generated by the user.

Fifth Embodiment

A fifth embodiment of this invention is similar to one of the first to third embodiments thereof except for an additional design mentioned hereafter. According to the fifth embodiment of this invention, the sound processor 150 or 550 filters the incoming sound signals about factors of frequency band, sound pressure level, and sound duration time chosen to match a typical human's clap. Then, sound processor 150 or 550 detects a clap by processing the filtered sound signals.

What is claimed is:

1. An apparatus comprising:
   at least two sound sensors for converting sounds into electric signals;
   means for determining an angular position of a sound source of a first sound wave as seen from the apparatus on the basis of moments of arrival of the first sound wave at the respective sound sensors which are represented by the electric signals, and determining an angular position of a sound source of a second sound wave as seen from the apparatus on the basis of moments of arrival of the second sound wave at the respective sound sensors which are represented by the electric signals, the second sound wave following the first sound wave in time domain;
   means for calculating a relative angle between the determined angular position of the sound source of the first sound wave and the determined angular position of the sound source of the second sound wave; and
   means for controlling a condition of the apparatus in response to the calculated relative angle;
   a monitor; and
   means for indicating controllable contents of the condition of the apparatus on the monitor;

wherein said calculating means comprises means for setting a group of selection zones substantially centered at the determined angular position of the sound source of the first sound wave, and the number of the selection zones is equal to the number of the controllable contents indicated on the monitor.

2. An apparatus as recited in claim 1, wherein the controlling means comprises means for deciding which of selection zones contains the calculated relative angle, and means for controlling the condition of the apparatus in accordance with a result of said deciding.

3. An apparatus as recited in claim 1, wherein the controlling means comprises means for deciding whether or not the calculated relative angle is within an effective range, and means for controlling the condition of the apparatus only when the deciding means decides that the calculated relative angle is within the effective range.

4. An apparatus comprising:
at least three sound sensors for converting sounds into electric signals;
means for determining a position of a sound source of a first sound wave as seen from the apparatus on the basis of moments of arrival of the first sound wave at the respective sound sensors which are represented by the electric signals, and determining a position of a sound source of a second sound wave as seen from the apparatus on the basis of moments of arrival of the second sound wave at the respective sound sensors which are represented by the electric signals, the second sound wave following the first sound wave in time domain;
means for calculating a relative position between the determined position of the sound source of the first sound wave and the determined position of the sound source of the second sound wave; and
means for controlling a condition of the apparatus in response to the calculated relative position;
a monitor; and
means for indicating controllable contents of the condition of the apparatus on the monitor;
wherein said calculating means comprises means for setting a group of selection zones substantially centered at the determined position of the sound source of the first sound wave, and the number of the selection zones is equal to the number of the controllable contents indicated on the monitor.

5. An apparatus as recited in claim 4, wherein the controlling means comprises means for deciding which of selection zones contains the calculated relative position, and means for controlling the condition of the apparatus in accordance with a result of said deciding.

6. An apparatus as recited in claim 4, wherein the controlling means comprises means for deciding whether or not the calculated relative position is within an effective range, and means for controlling the condition of the apparatus only when the deciding means decides that the calculated relative position is within the effective range.

7. An apparatus as recited in claim 6, wherein the effective range extends from a first given angle less than an angle of the determined position of the sound source of the first sound wave to a second given angle greater than the angle of the determined position of the sound source of the first sound wave, and extends in a distance-wise direction up to a given distance greater than the distance between the apparatus and the determined position of the sound source of the first sound wave, the first given angle and the second given angle being defined in a horizontal plane perpendicular to a screen of the monitor.

8. An apparatus as recited in claim 6, wherein the effective range is a circle having a given radius and centered at the determined position of the sound source of the first sound wave.

9. An apparatus as recited in claim 1, further comprising means for indicating the calculated relative angle on the monitor.

10. An apparatus as recited in claim 1, further comprising loudspeakers, means for generating vocal messages from the loudspeakers which indicate controllable contents of the condition of the apparatus on the monitor in a manner such that the indicated controllable contents are related with an angular position at which a sound wave is to be generated, and means for causing the loudspeakers to present a sound image located at a position corresponding to the calculated relative angle.

11. An apparatus as recited in claim 1, wherein the controlling means comprises means for deciding whether or not the calculated relative angle is within an effective range, and means for controlling the condition of the apparatus only when the deciding means decides that the calculated relative angle is within the effective range, and wherein the effective range extends from a first given angle less than an angle of the determined angular position of the sound source of the first sound wave to a second given angle greater than the angle of the determined angular position of the sound source of the first sound wave, the first given angle and the second given angle being defined in a horizontal plane perpendicular to a screen of the monitor.

12. An apparatus as recited in claim 4, further comprising means for indicating the calculated relative position on the monitor.

13. An apparatus as recited in claim 4, further comprising loudspeakers, means for generating vocal messages from the loudspeakers which indicate controllable contents of the condition of the apparatus on the monitor in a manner such that the indicated controllable contents are related with a position at which a sound wave is to be generated, and means for causing the loudspeakers to present a sound image located at a position corresponding to the calculated relative position.

14. A method of operating an apparatus having a monitor, comprising the steps of:
detecting a first sound reaching the apparatus;
displaying a picture on the monitor when the first sound is detected, the picture having portions indicating controllable items respectively;
detecting a position of a source of the detected first sound;
setting a group of selection zones substantially centered at the detected position of the source of the detected first sound, the selection zones extending in places corresponding to positions of the portions of the picture respectively;
detecting a second sound reaching the apparatus after the first sound is detected;
detecting a position of a source of the detected second sound;
deciding which of the selection zones contains the detected position of the source of the detected second sound; and
deciding which of the controllable items is selected in accordance with a result of deciding which of the selection zones contains the detected position of the source of the detected second sound;
wherein the number of the selection zones is equal to the number of the controllable items.

* * * * *